(12) United States Patent
Kuriyama et al.

(10) Patent No.: US 11,068,744 B2
(45) Date of Patent: Jul. 20, 2021

(54) OPERATION STATE CLASSIFICATION APPARATUS

(71) Applicant: Mitsubishi Electric Corporation, Tokyo (JP)

(72) Inventors: Toshiyuki Kuriyama, Tokyo (JP); Norio Hirai, Tokyo (JP); Makoto Imamura, Tokyo (JP); Takahisa Hirata, Tokyo (JP); Takaaki Nakamura, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 457 days.

(21) Appl. No.: 15/772,262

(22) PCT Filed: Jan. 13, 2016

(86) PCT No.: PCT/JP2016/050822
§ 371 (c)(1),
(2) Date: Apr. 30, 2018

(87) PCT Pub. No.: WO2017/122292
PCT Pub. Date: Jul. 20, 2017

(65) Prior Publication Data
US 2018/0314914 A1 Nov. 1, 2018

(51) Int. Cl.
*G06K 9/62* (2006.01)
*G05B 23/02* (2006.01)

(52) U.S. Cl.
CPC ......... *G06K 9/6247* (2013.01); *G05B 23/024* (2013.01); *G05B 23/0221* (2013.01); *G05B 23/0254* (2013.01); *G06K 9/6267* (2013.01)

(58) Field of Classification Search
CPC ..................................................... G06K 9/6247
(Continued)

(56) References Cited

U.S. PATENT DOCUMENTS

| | | | |
|---|---|---|---|
| 6,917,839 B2 * | 7/2005 | Bickford | G05B 23/0275 700/30 |
| 7,475,052 B2 | 1/2009 | Ide | |

(Continued)

FOREIGN PATENT DOCUMENTS

| | | |
|---|---|---|
| JP | 10-238920 A | 9/1998 |
| JP | 11-161318 A | 6/1999 |

(Continued)

OTHER PUBLICATIONS

Extended European Search Report issued in corresponding EP Application No. 16884895.0 dated Jan. 11, 2019.

(Continued)

*Primary Examiner* — Ricky Go
(74) *Attorney, Agent, or Firm* — Birch, Stewart, Kolasch & Birch, LLP

(57) ABSTRACT

A principal component calculating unit (13) for calculating a principal component of a plurality of sensor data collected from a device, and a physical quantity for failure determination calculating unit (11) for calculating a physical quantity to be used for failure determination on the basis of the plurality of sensor data are provided. Further, an operation state classification unit (14) for generating classification, for each operation state, of the sensor data collected from the device, using the principal component calculated by the principal component calculating unit (13) and the physical quantity calculated by the physical quantity for failure determination calculating unit (11) is provided.

9 Claims, 18 Drawing Sheets

(58) Field of Classification Search
USPC .......................................................... 702/183
See application file for complete search history.

(56) References Cited

U.S. PATENT DOCUMENTS

| | | | | |
|---|---|---|---|---|
| 2003/0110147 A1* | 6/2003 | Li | ...................... | G06K 9/00228 706/1 |
| 2004/0254761 A1 | 12/2004 | Sakano et al. | | |
| 2005/0149297 A1 | 7/2005 | Guralnik et al. | | |
| 2007/0265806 A1* | 11/2007 | Kim | ...................... | G01H 9/004 702/187 |
| 2007/0282777 A1* | 12/2007 | Guralnik | ............ | G05B 23/0254 706/48 |
| 2008/0114564 A1* | 5/2008 | Ihara | .................... | G06K 9/6215 702/158 |
| 2009/0204237 A1* | 8/2009 | Sustaeta | ............ | G05B 13/0285 700/36 |
| 2011/0270535 A1* | 11/2011 | Sigman | .............. | G06K 9/00536 702/28 |
| 2014/0058705 A1* | 2/2014 | Brill | ..................... | G06Q 10/063 702/183 |
| 2014/0278165 A1* | 9/2014 | Wenzel | .............. | G06Q 10/0639 702/61 |
| 2014/0288768 A1 | 9/2014 | Fujiwara et al. | | |
| 2015/0278711 A1* | 10/2015 | Angelov | ................ | G06N 20/00 706/12 |

FOREIGN PATENT DOCUMENTS

| | | |
|---|---|---|
| JP | 2002-25981 A | 1/2002 |
| JP | 3604855 B2 | 12/2004 |

OTHER PUBLICATIONS

Hosoya, "Development of the Failure Prediction System for Refrigerating and Air Conditioning Machine", Gunma Industrial Technology Center, 2007, pp. 1-4.

Partial Supplementary European Search Report issued in corresponding European 16884895.0 dated Sep. 20, 2018. Application No. 16884895.0 dated Sep. 20, 2018.

* cited by examiner

FIG. 3

| Date and Time | ○○ Temperature | ×× Pressure | Compressor Unit Electronic Expansion Valve Opening | Cooling Unit Electronic Expansion Valve Opening | Compressor Frequency | Fan Frequency | Wind Outlet Temperature | ... | Mode |
|---|---|---|---|---|---|---|---|---|---|
| 2015/7/9 10:50 | 30.3 | 40 | ... | ... | ... | 100Hz | 25.0 | ... | Cooling |
| 2015/7/9 10:51 | 30.5 | 40 | ... | ... | ... | 120Hz | 25.0 | ... | Cooling |
| 2015/7/9 10:52 | 30.5 | 40 | ... | ... | ... | 110Hz | 26.5 | ... | Dry |
| 2015/7/9 10:53 | 30.8 | 40 | ... | ... | ... | 130Hz | 27.0 | ... | Dry |
| 2015/7/9 10:54 | 30.4 | 40 | ... | ... | ... | 100Hz | 26.8 | ... | Dry |
| ... | ... | ... | ... | ... | ... | ... | ... | ... | ... |

| Model | Installation Environment Information | Failure Related Information | |
|---|---|---|---|
| | | Failure Details | Sensor Item Having High Relation with Failure |
| Air Conditioner | Cooling Unit Model (AAAA1-X) Compressor Unit Model (AAAA1-Y) Piping Internal Volume (10L) | Filter Clogging | Fan Frequency |

FIG. 12

(A) Sensor Items to Be Used for Principal Component Calculation and Weights Thereof

| Sensor Item Name | ○○Temperature | ××Pressure | △△Opening | |
|---|---|---|---|---|
| Weight (Data Shaping) | 0.57 | 0.18 | 0.26 | ... |
| Weight (Principal Component Calculation) | 0.11 | 0.98 | 0.11 | |

(B) Range of Principal Component of Each Operation State Number

| Operation State Number | 1 | 2 | 3 | |
|---|---|---|---|---|
| MAX | 1.25 | 2.36 | 3.52 | ... |
| MIN | 0.02 | 1.25 | 2.36 | |

FIG. 13A

| Date and Time Data | | Operation State Number | Physical Quantity for Failure Determination |
|---|---|---|---|
| 2007/7/25 | 3:44:33 | 19 | 130Hz |
| 2007/7/25 | 3:46:33 | 9 | 90Hz |
| 2007/7/25 | 3:48:32 | 36 | 200Hz |
| 2007/7/25 | 3:50:32 | 18 | 100Hz |
| 2007/7/25 | 3:52:31 | 18 | 102Hz |
| 2007/7/25 | 3:54:31 | 23 | 180Hz |
| 2007/7/25 | 3:56:30 | 40 | 220Hz |
| 2007/7/25 | 3:58:30 | 40 | 220Hz |
| 2007/7/25 | 4:00:29 | 18 | 180Hz |

| Date and Time Data | | Filter Clogging | | Quantity of Refrigerant | |
|---|---|---|---|---|---|
| 2007/7/25 | 3:44:33 | 19 | 130Hz | 119 | 10kg |
| 2007/7/25 | 3:46:33 | 9 | 90Hz | 109 | 8kg |
| 2007/7/25 | 3:48:32 | 36 | 200Hz | 136 | 20kg |
| 2007/7/25 | 3:50:32 | 18 | 100Hz | 118 | 9kg |
| 2007/7/25 | 3:52:31 | 18 | 102Hz | 117 | 9kg |
| 2007/7/25 | 3:54:31 | 23 | 180Hz | 123 | 18kg |
| 2007/7/25 | 3:56:30 | 40 | 220Hz | 140 | 22kg |
| 2007/7/25 | 3:58:30 | 40 | 220Hz | 142 | 24kg |
| 2007/7/25 | 4:00:29 | 18 | 180Hz | 118 | 7kg |
| | | Operation State Number | Physical Quantity for Failure Determination | Operation State Number | Physical Quantity for Failure Determination |

⋮

OPERATION STATE CLASSIFICATION APPARATUS

TECHNICAL FIELD

The present invention relates to an operation state classification apparatus that generates classification, for each operation state, of sensor data acquired from sensors installed in a control device in a control system of an elevator, a plant apparatus, an air conditioner, or the like.

BACKGROUND ART

In a device such as an elevator, a plant apparatus, or an air conditioner, a control technique to detect failure by comparing a measurement value acquired by a sensor installed in the device with a threshold value predetermined for each sensor item is known.

However, some of various devices have variety of operation states depending on an installation environment, a model of the device, or a use state. In such a case, in the above control technique, when a measurement value of a specific sensor item exceeds the threshold value, it is very difficult to determine whether the exceeding is due to failure (abnormality) of the device or due to change of the operation state.

On the other hand, for example, Patent Literature 1 discloses a technique to detect failure by storing a past operation rate for each predetermined operation condition and comparing the past operation rate and current operation rate for each operation condition.

However, according to the technique disclosed in Patent Literature 1, the operation condition is determined only by a load in a building in which the device is installed, and classification of the operation conditions, that is, classification of operation states depends on a local state. Therefore, there is a problem that detection accuracy of failures cannot be improved. Meanwhile, if the number of sensor items used for the classification of operation states is increased, the number of classifications becomes excessive, and as a result, the same operation state does not occur and failure detection cannot be performed.

In relation to this problem, Patent Literature 2 discloses a technique in a processing apparatus such as a plasma processing apparatus, in which detection values detected using a plurality of detectors are used as operation data, principal component analysis is performed using a plurality of the operation data and dimension reduction is performed, calculated principal component scores of the operation data are monitored, and when a principal component score significantly deviates from a set reference, it is used for determination of abnormality of the processing apparatus.

CITATION LIST

Patent Literatures

Patent Literature 1: JP H10-238920 (1998-238920 A)
Patent Literature 2: JP 2002-25981 A

SUMMARY OF INVENTION

Technical Problem

The technique disclosed in Patent Literature 2 performs the dimension reduction using the principal component analysis, and thus the number of classifications does not become excessive even if the number of detectors is large so that the detection accuracy of failures may be improved. However, in this technique, even if the principal component score significantly deviates from the reference, it cannot be immediately determined whether the cause of the deviation is due to abnormality or failure of the device or due to change of an operation state. For this reason, in the final determination, an analysis of the operation data of the detectors is required once again, and there is a problem that failure detection cannot be necessarily efficiently performed.

The present invention has been made to solve the above problems, and an object of the present invention is to generate classification effective for failure detection, using principal components.

Solution to Problem

An operation state classification apparatus according to the present invention includes: a principal component calculating unit calculating a principal component of a plurality of sensor data collected from a device; a physical quantity for failure determination calculating unit calculating a physical quantity to be used for failure determination on a basis of the plurality of sensor data; and an operation state classification unit performing generation of classification of a sensor data collected from the device for each operation state using the principal component calculated by the principal component calculating unit and the physical quantity calculated by the physical quantity for failure determination calculating unit.

Advantageous Effects of Invention

An operation state classification apparatus according to the present invention generates classification of sensor data, for each operation state, using principal components of a plurality of sensor data and a physical quantity to be used for failure determination calculated on the basis of the sensor data. That is, according to the operation state classification apparatus of the present invention, classification of operation states effective for failure detection can be generated using principal components.

BRIEF DESCRIPTION OF DRAWINGS

FIG. 3 is a diagram for describing examples of sensor data accumulated in the sensor data accumulation DB;

FIG. 12 shows diagrams for describing examples of data stored in a parameter for data classification storage unit in the first embodiment;

FIGS. 13A and 13B are diagrams for describing examples of sensor data as samples accumulated in a post-classification sensor data accumulation DB in the first embodiment;

DESCRIPTION OF EMBODIMENTS

Hereinafter, some embodiments of the present invention will be described in detail with reference to the accompanying drawings.

First Embodiment

Figure 1:
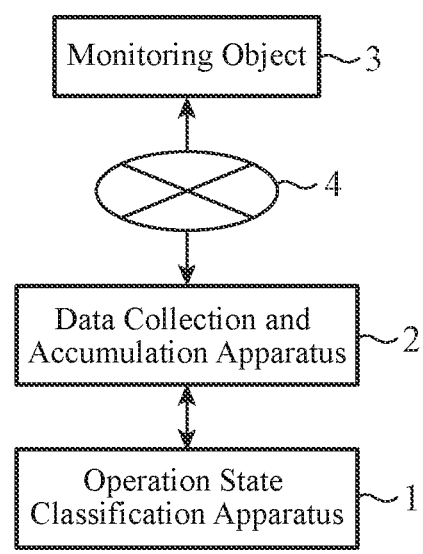
FIG. 1 is a configuration diagram of a sensor data classification system for causing an operation state classification apparatus of a first embodiment of the present invention to classify sensor data collected from a monitoring object in a facility in accordance with an operation state.

FIG. 1 is a configuration diagram of a sensor data classification system for causing an operation state classification apparatus 1 of a first embodiment of the present invention to classify sensor data collected from a monitoring object in a facility in accordance with an operation state.

As illustrated in FIG. 1, the sensor data classification system includes a monitoring object 3, a data collection and accumulation apparatus 2, and an operation state classification apparatus 1.

The monitoring object 3 is, for example, a device such as an air conditioner, an elevator, or a plant apparatus. The monitoring object 3 may be configured from one or more connected devices such as all air conditioning units in a building.

The monitoring object 3 and the data collection and accumulation apparatus 2 are connected by a sensor network 4, and the data collection and accumulation apparatus 2 continuously or intermittently collects and accumulates an aggregation of measurement values output by various sensors installed in the device as the monitoring object 3 through the sensor network 4. Note that, here, an aggregation of the measurement values as instantaneous values collected from the plurality of various sensors installed in the device of the monitoring object 3 is referred to as sensor data.

To be specific, a data collection unit (not illustrated) of the data collection and accumulation apparatus 2 collects the aggregation of the measurement values from the various sensors installed in the device of the monitoring object 3 as the sensor data, and makes the sensor data accumulation database (DB) 21 accumulate the sensor data together with the collection date and time.

Further, the data collection and accumulation apparatus 2 includes a device information DB 22 storing device information of the monitoring object 3. The sensor data accumulation DB 21 and the device information DB 22 will be described later.

The operation state classification apparatus 1 calculates principal components regarding the plurality of sensor data collected from the monitoring object 3 on the basis of the plurality of sensor data accumulated in the sensor data accumulation DB 21 stored by the data collection and accumulation apparatus 2 and the device information stored in the device information DB 22. Further, the operation state classification apparatus 1 classifies the sensor data according to the operation state, using the calculated principal components, and accumulates the sensor data as post-classification sensor data. A manager or the like of a facility such as a building monitors the operation state such as deterioration or failure of the monitoring object 3 on the basis of the post-classification sensor data accumulated by the operation state classification apparatus 1.

Further, here, as illustrated in FIG. 1, the monitoring object 3 and the data collection and accumulation apparatus 2 are connected by the sensor network 4. However, this embodiment is not limited thereto. The monitoring object 3 and the data collection and accumulation apparatus 2 may be directly connected without being connected to the sensor network 4.

Further, hereinafter, it is assumed that the operation state classification apparatus 1 performs classification in accordance with the operation state, using the sensor data collected from the various sensors installed in an air conditioner, for example. That E, the monitoring object 3 is an air conditioner, and in the following description, an air conditioner is simply referred to a device.

Note that this is only an example, and the monitoring object 3 is not limited to the air conditioner, and may be another control device in a facility such as an elevator or a plant apparatus.

Figure 2:
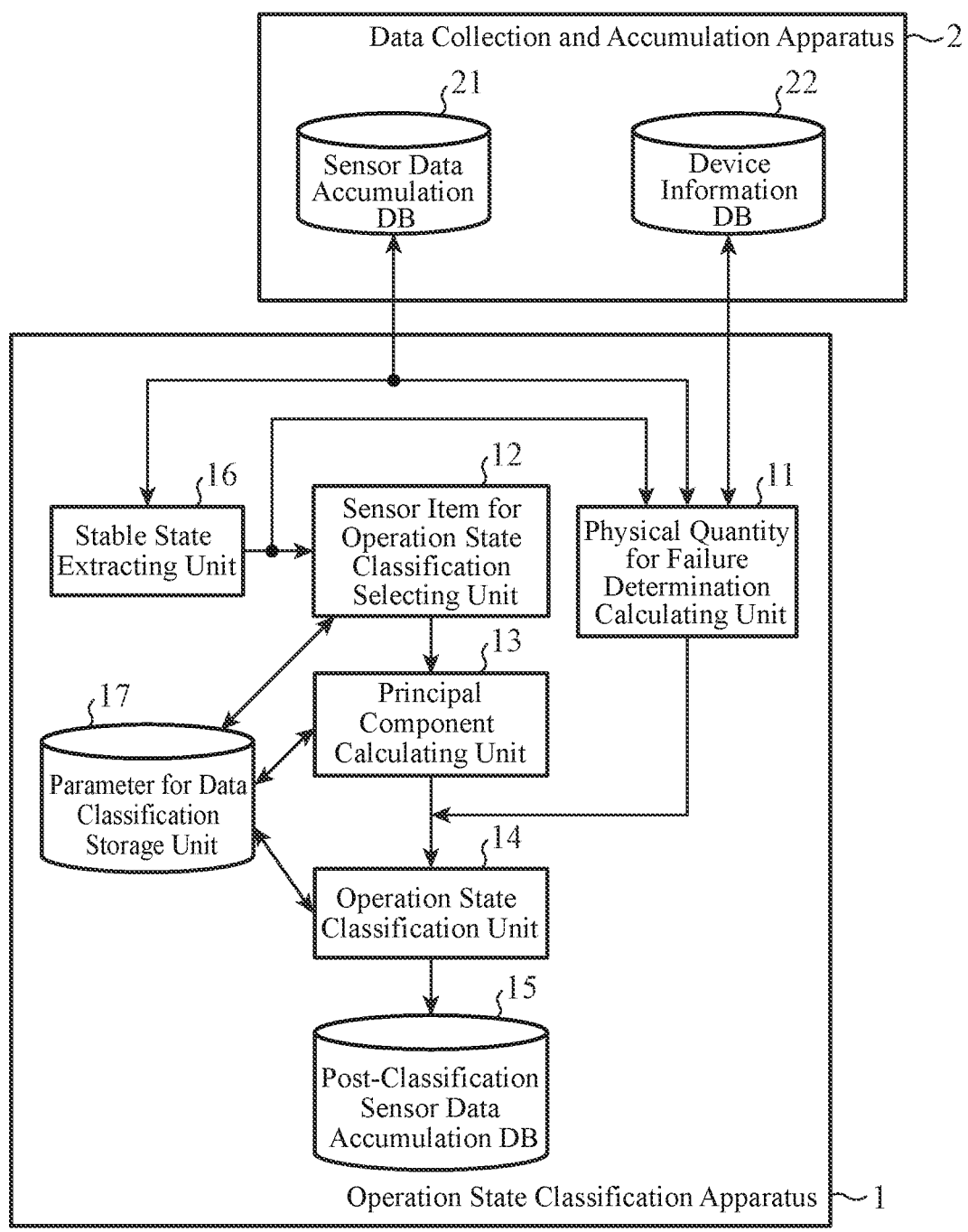
FIG. 2 is a configuration diagram of the operation state classification apparatus according to the first embodiment of the present invention.

FIG. 2 is a configuration diagram of the operation state classification apparatus 1 according to the first embodiment of the present invention.

As illustrated in FIG. 2, the operation state classification apparatus 1 includes a physical quantity for failure determination calculating unit 11, a sensor item for operation state classification selecting unit 12, a principal component calculating unit 13, an operation state classification unit 14, a post-classification sensor data accumulation DB 15, a stable state extracting unit 16, and a parameter for data classification storage unit 17.

The physical quantity for failure determination calculating unit 11 selects a sensor item to be used for failure determination, and extracts or calculates a physical quantity to be used for failure determination, for each sample extracted by the stable state extracting unit 16, by reference to the sensor data accumulation DB 21 and the device information DB 22 of the data collection and accumulation apparatus 2. The stable state extracting unit 16 will be described later.

Note that items for which failure determination is performed, such as "filter clogging", are preset by the manager or the like of the monitoring object 3, and the physical quantity for failure determination calculating unit 11 extracts or calculates the physical quantity to be used for failure determination on the basis of the preset items.

In this first embodiment, as the physical quantity to be used for failure determination, that is, a physical quantity for failure determination, two types of physical quantities, "a physical quantity of a sensor item having a highest correlation with failure to be determined", and "a physical quantity obtained by calculation based on a plurality of sensor data, such as a quantity of refrigerant" are assumed.

In accordance with the content of the failure determination, in a case of using the "physical quantity of a sensor item having a highest correlation with failure to be determined" as the physical quantity for failure determination, the physical quantity for failure determination calculating unit 11 extracts appropriate sensor data from the sensor data accumulation DB 21 as the physical quantity for failure determination Further, for example, in a case of using the "physical quantity obtained by calculation based on a plurality of sensor data, such as a quantity of refrigerant" as the physical quantity for failure determination, the physical quantity for failure determination calculating unit 11 calculates the physical quantity for failure determination on the basis of the sensor data accumulated in the sensor data accumulation DB 21.

Here, the calculation of the physical quantity for failure determination includes extraction of the physical quantity for failure determination.

Here, FIG. 3 is a diagram for describing examples of the sensor data accumulated in the sensor data accumulation DB 21.

In the sensor data accumulation DB 21, as illustrated in FIG. 3, sensor items for which values are measured by the various sensors installed in the monitoring object 3, and measurement values measured with respect to the sensor items are accumulated as one record of sensor data, for each collected date and time. In the first embodiment, among such sensor data, one acquired or extracted for classification generation is specifically referred to as a sample.

Figures 4, 5:
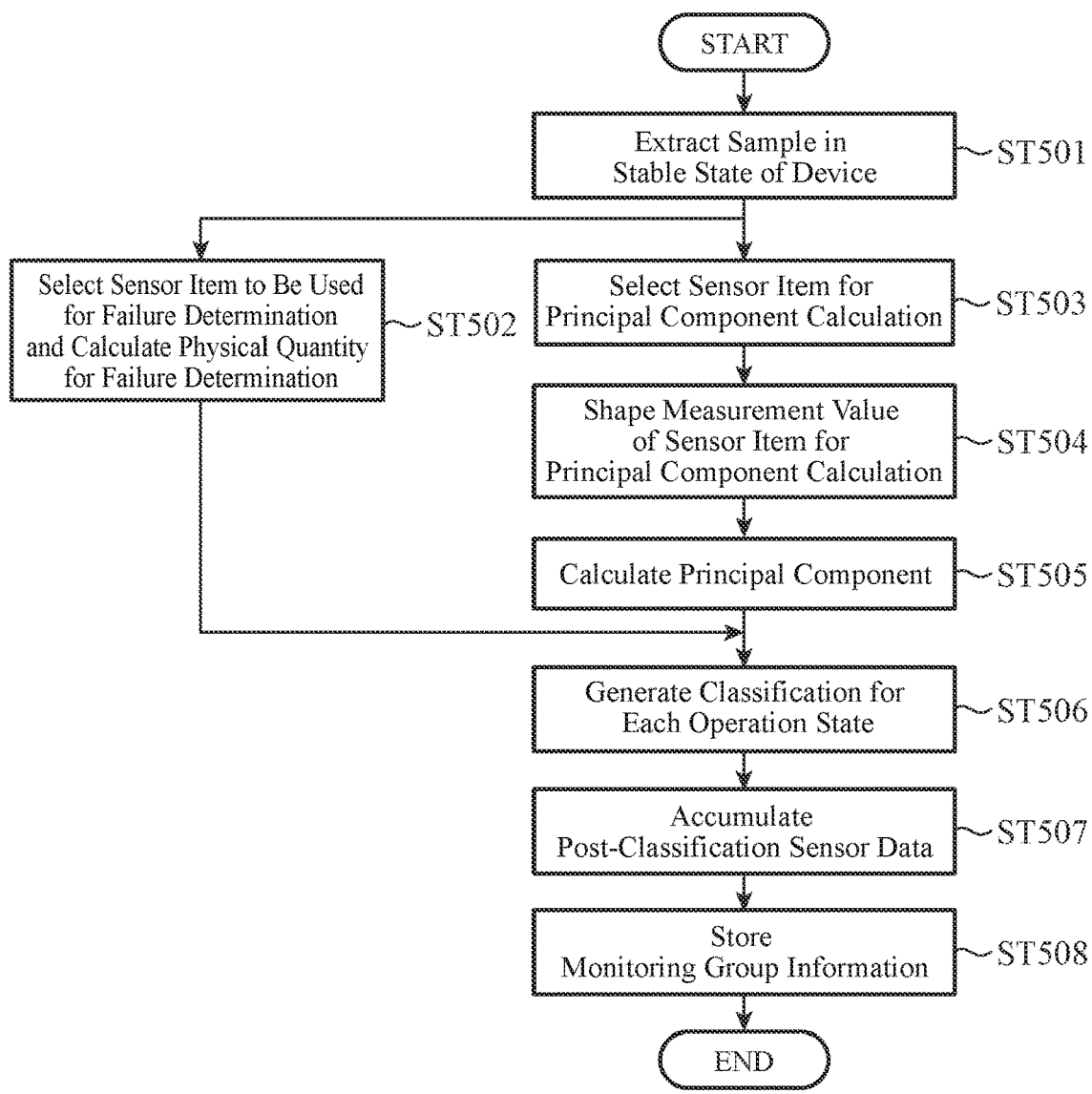
FIG. 4 is a diagram for describing an example of specific information stored in a device information DB.
FIG. 5 is a flowchart for describing an operation of the operation state classification apparatus at the first operation according to the first embodiment of the present invention.

FIG. 4 is a diagram for explaining an example of specific information stored in the device information DB 22.

The device information DB 22 stores device information of the monitoring object 3. As illustrated in FIG. 4, the device information DB 22 stores, for each device, at least a model, installation environment information. The device information DB 22 further stores information of failure details and a sensor item having a high correlation with the failure, as failure related information necessary for calculation of the physical quantity for failure determination.

The above-described "physical quantity of a sensor item having a highest correlation with failure to be determined" or "physical quantity obtained by calculation based on a plurality of sensor data, such as a quantity of refrigerant" indicates a measurement value of a sensor item having the highest correlation with failure that a user wishes to detect, or a physical quantity calculated on the basis of preset information. Note that, it is assumed that the user, that is, an observer of the monitoring object 3, appropriately sets the failure that the user wishes to detect in advance.

For example, in a case where the user sets the "filter clogging" of the air conditioner as an object for failure detection, the physical quantity for failure determination calculating unit 11 specifies a fan frequency as the sensor item having the highest correlation with the "filter clogging", by reference to the device information DB 22. Then, the physical quantity for failure determination calculating unit 11 extracts the measurement value regarding the specified fan frequency as the physical quantity for failure determination from the sensor data accumulation DB 21.

Further, for example, in a case where the user employs the "quantity of refrigerant existing in a system" as the object for failure detection, the physical quantity for failure determination calculating unit 11 calculates the quantity of refrigerant, using a known technique disclosed in WO 2011/048721, for example, as a technique to estimate a quantity of refrigerant, and employs the calculated quantity of refrigerant as the physical quantity for failure determination.

Note that an internal volume of container in which the refrigerant of cooling unit and compressor unit is stored is different depending on the model. Therefore, to estimate the quantity of refrigerant, information of the internal volume of the container is required. Further, to calculate the quantity of refrigerant, information of an internal volume of piping that connects the cooling unit and the compressor unit is also required.

The physical quantity for failure determination calculating unit 11 obtains installation environment information such as the information of the internal volume of the container and the internal volume of the piping from the device information DB 22, and calculates the quantity of refrigerant.

Note that the information illustrated in FIGS. 3 and 4 is merely an example, and it is enough for the sensor data accumulation DB 21 to accumulate the sensor data collected from the various sensors installed in the monitoring object 3, and it is enough for the device information DB 22 to store information used by the physical quantity for failure determination calculating unit 11 to calculate the physical quantity for failure determination.

The stable state extracting unit 16 acquires samples in a period determined in advance from the sensor data accumulation DB 21 of the data collection and accumulation apparatus 2, and extracts samples corresponding to a stable state of the device, out of the acquired samples. To be specific, the stable state extracting unit 16 acquires the samples in the period determined in advance from the sensor data accumulation DB 21 of the data collection and accumulation apparatus 2, and extracts only samples stable in time-series order, for the sensor item that indicates the operation state of the device, as described in FIG. 3, out of the acquired samples. Here, the sample corresponding to a stable state of the device refers to a sample of a case in which the measurement values in all the sensor data acquired within a predetermined period fall within a normal range determined in advance, among the samples in the period determined in advance acquired from the sensor data accumulation DB 21, and the stable state extracting unit 16 extracts the sample falling within the normal range as the sample corresponding to a stable state of the device. The stable state extracting unit 16 shifts the period determined in advance by every one sample, and extracts a stable sample in the shifted predetermined period.

The stable state extracting unit 16 outputs the extracted sample to the sensor item for operation state classification selecting unit 12 and the physical quantity for failure determination calculating unit 11.

The sensor item for operation state classification selecting unit 12 selects the sensor item to be used for principal component calculation of the sample, out of the sensor items regarding the measurement values included in the sample output by the stable state extracting unit 16, and shapes the measurement value of the selected sensor item for principal component calculation. The sensor item for operation state classification selecting unit 12 outputs the post-shaping sample to the principal component calculating unit 13.

In addition, the sensor item for operation state classification selecting unit 12 stores information of the sensor item to be used for principal component calculation of the sensor data in units of sample, and weight for sensor data shaping of each sensor item used for measurement value shaping, in the parameter for data classification storage unit 17 at the first time of classifying the collected samples, that is, at the time of generating classification for each operation state. After that, the sensor item for operation state classification selecting unit 12 can shape the measurement value, using the information stored in the parameter for data classification storage unit 17 when classifying the collected samples.

The principal component calculating unit 13 calculates principal components on the basis of a plurality of post-shaping samples, that is, a plurality of sensor data which are output by the sensor item for operation state classification selecting unit 12. Further, the principal component calculating unit 13 calculates values of the principal components of the samples, on the basis of an expression that expresses the calculated principal component. The principal component calculating unit 13 associates the sensor data as the samples output from the sensor item for operation state classification selecting unit 12 with information of the calculated principal component values of the samples, and outputs the associated data to the operation state classification unit 14.

Further, the principal component calculating unit 13 stores information of the weight used for the principal component calculation used in an expression that expresses the principal component in the parameter for data classification storage unit 17 at the first time to classify the collected samples, that is, at the time of generating classification for each operation state. After that, the principal component calculating unit 13 calculates the principal component values, using the information of the weight used for the principal component calculation stored in the parameter for data classification storage unit 17 when classifying the collected samples or sensor data.

The operation state classification unit 14 generates classification of the sample, that is, the sensor data, for each operation state, using the physical quantity for failure determination of each sample output by the physical quantity for failure determination calculating unit 11 and the principal component value of the sensor data output by the principal component calculating unit 13 as the sample. Further, the operation state classification unit 14 assigns an operation state number to each operation state for each samples and classifies the sample, and accumulates the sensor data as the samples after classification and the physical quantities for failure determination corresponding to the sample in the post-classification sensor data accumulation DB 15.

The operation state classification unit 14 generates classification for each operation state at the first time to classify the collected samples, that is, at the time of generating classification for each operation state, and stores a range of the principal component in the classification for each operation state in the parameter for data classification storage unit 17 in association with the operation state number. After that, the operation state classification unit 14 classifies the samples or the sensor data for each operation state, on the basis of the range of the principal component stored in the parameter for data classification storage unit 17 when classifying the collected samples or the sensor data.

The post-classification sensor data accumulation DB 15 accumulates the sensor data as the sample assigned with the operation state number for each operation state and classified, which has been output from the operation state classification unit 14, and the physical quantity for failure determination corresponding to the sample.

The parameter for data classification storage unit 17 stores the sensor item to be used for principal component calculation of the sensor data of the sample selected by the sensor item for operation state classification selecting unit 12, weight for sensor data shaping for each sensor item used for measurement value shaping of the sensor item by the sensor item for operation state classification selecting unit 12, and the information regarding the weight used for principal component calculation used in the expression expressing the principal component obtained by the principal component calculating unit 13, at the first time to classify the collected samples, that is, at the time of generating classification for each operation state. Further, the parameter for data classification storage unit 17 stores information of the ranges of the principal components in the operation state number assigned by the operation state classification unit 14 at the first time to classify the collected samples.

Note that, here, as illustrated in FIG. 2, the operation state classification apparatus 1 is provided with the post-classification sensor data accumulation DB 15 and the parameter for data classification storage unit 17. However, the embodiment is not limited thereto, and the post-classification sensor data accumulation DB 15 and the parameter for data classification storage unit 17 may be provided outside the operation state classification apparatus 1.

Next, an operation will be described.

The operation of the operation state classification apparatus 1 according to the first embodiment of the present invention is roughly divided into "an operation to generate classification for each operation state using collected samples at the first time", and "an operation to assign an operation state number to and classify a continuously collected sample or sensor data after generation of classification".

In the "operation to generate classification for each operation state using collected samples at the first time", classification of samples for each operation state is generated using the calculated principal component of the sensor data and the physical quantity to be used for failure determination. After that, in the "operation to assign an operation state number to and classify a continuously collected sample or sensor data after generation of classification", the collected sample is classified into an operation state on the basis of the range of the principal component of the generated classification for each operation state.

Note that, in the following description, it is assumed that the generated classification is continuously used once after the classification of the operation state is generated at the first operation. However, the embodiment is not limited thereto. For example, in a case where it is preferable for monitoring to generate a different classification of an operation state due to large change of an operation environment of the monitoring object 3 such as change of seasons, the "operation to generate classification for each operation state using collected samples at the first time" may be performed again using the samples acquired in a period different from the previous time, and classification of a new operation state may be generated. The timing of generating the classification of the operation state can be appropriately set.

First, the "operation to generate classification for each operation state using collected samples at the first time" will be described along the flowchart of FIG. 5.

FIG. 5 is a flowchart for describing an operation of the operation state classification apparatus 1 at the first operation according to the first embodiment of the present invention.

The stable state extracting unit 16 acquires sensor data in a period determined in advance from the sensor data accumulation DB 21 of the data collection and accumulation apparatus 2 as samples, and extracts a sample corresponding to a stable state of the device, out of the acquired samples, as a sample in a stable state (step ST501). For example, assuming that the operation states are classified for the samples collected from the air conditioner in summer, and the data to be classified are samples of most recent July to September. The stable state extracting unit 16 acquires the sensor data in the most recent three months from July to September from the sensor data accumulation DB 21 as the samples, and extracts only the samples stable in time-series order with respect to the measurement values of the sensor items that indicate the operation state of the device, such as a wind outlet temperature, out of the samples in the three months, as the samples in a stable state (see 601 in FIG. 6).

To be specific, samples in x minutes are regarded as one window, and the last sample of a window is set as a sample to be determined. The sample in a stable state refers to a sample to be determined in a case in which all the measurement values in all the samples in the one window fall within a predetermined normal range, and the stable state extracting unit 16 extracts the sample to be determined that satisfies the condition as the sample in a stable state.

Figure 6:
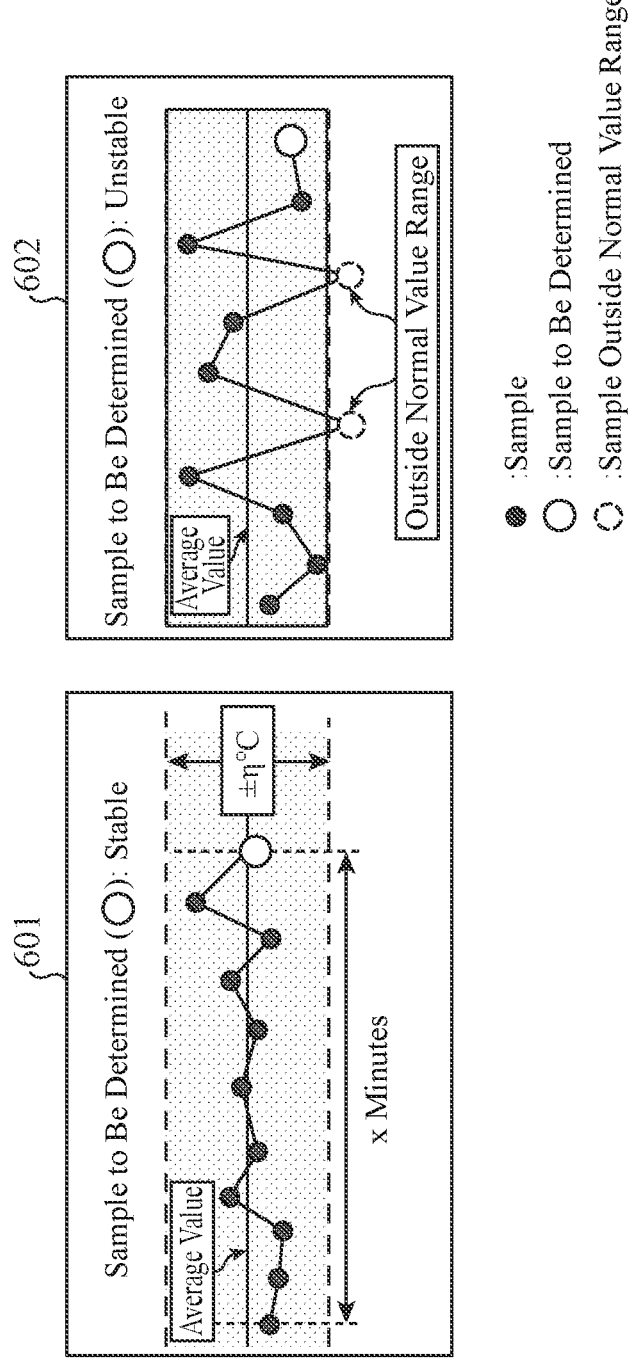
FIG. 6 shows diagrams for describing sensor data extracted by a stable state extracting unit in the first embodiment.

For example, as illustrated in 601 in FIG. 6, for a measurement value of a certain sensor item, in a case where an average value of the measurement values in x minutes ±η° C. is set to be the normal range, and all the measurement values in the x minutes fall within the normal range, the stable state extracting unit 16 extracts the sample to be determined as the sample in a stable state.

The stable state extracting unit 16 performs determination of whether the sample is in the stable state for the measurement values of all the sensor items included in the sample.

Conversely, if even one of the measurement values included in all the samples in one window falls outside the normal range, the stable state extracting unit 16 removes the sample to be determined as an unstable sample, as illustrated in 602 in FIG. 6.

The stable state extracting unit 16 outputs the extracted sample in a stable state to the sensor item for operation state classification selecting unit 12. In addition, the stable state extracting unit 16 outputs information of collection date and time of the extracted sample in a stable state or the extracted sample in a stable state to the physical quantity for failure determination calculating unit 11.

The physical quantity for failure determination calculating unit 11 selects the sensor item to be used for failure determination and calculates the physical quantity for failure determination by reference to the sensor data accumulation DB 21 and the device information DB 22 of the data collection and accumulation apparatus 2 (step ST502).

To be specific, here, for example, it is assumed that the "filter clogging" of the air conditioner is set as the object for failure detection, and information as illustrated in FIG. 4 is stored in the device information DB 22. The physical quantity for failure determination calculating unit 11 specifies the fan frequency as the sensor item having the highest correlation with the "filter clogging" by reference to the device information DB 22. Then, the physical quantity for failure determination calculating unit 11 extracts, from the sensor data accumulation DB 21, the measurement values regarding the specified fan frequency, which correspond to the samples output by the stable state extracting unit 16 in step ST501, respectively, as the physical quantities for failure determination. Note that the corresponding measurement value can be specified on the basis of the information of collection date and time output from the stable state extracting unit 16. In addition, since the acquired sample includes a measurement value, in a case where a sample in a stable state is output from the stable state extracting unit 16, the physical quantity for failure determination calculating unit 11 may extract the measurement value regarding the specified fan frequency from the sample as the physical quantity for failure determination.

The physical quantity for failure determination calculating unit 11 outputs the physical quantity for failure determination to the operation state classification unit 14. At this time, the physical quantity for failure determination calculating unit 11 outputs, for each sample, information regarding the physical quantity for failure determination, as information associated with the calculated physical quantity for failure determination. To be specific, the physical quantity for failure determination calculating unit 11 outputs the collection date and time of the sample and the physical quantity for failure determination in association with each other. Note that, in the first embodiment, the physical quantity for failure determination calculating unit 11 directly outputs the information regarding the physical quantity for failure determination to the operation state classification unit 14. However, the embodiment is not limited thereto. The physical quantity for failure determination calculating unit 11 may store the information regarding the physical quantity for failure determination in a physical quantity for failure determination storage unit (not illustrated), and the operation state classification unit 14 may classify the operation state by reference to the physical quantity for failure determination storage unit. The operation of the operation state classification unit 14 will be described later.

The sensor item for operation state classification selecting unit 12 selects the sensor item to be used for principal component calculation of the sample, from among the sensor items regarding the measurement values included in the sample output by the stable state extracting unit 16 in step ST501 (step ST503).

In this step ST503, the sensor item for operation state classification selecting unit 12 selects the sensor item to be used when the principal component calculating unit 13 calculates the principal component. At this time, the sensor item for operation state classification selecting unit 12 stores the information of the selected sensor item in the parameter for data classification storage unit 17. The operation of the principal component calculation by the principal component calculating unit 13 will be described later.

To be specific, in step ST503, for example, the sensor item for operation state classification selecting unit 12 does not use a sensor item for which only a unique value is output, as an item used for principal component calculation, for improving calculation speed of the principal component. Further, for example, a sensor item with large variation in the measurement values and extremely large variance in the sensor data is not used for principal component calculation. To be specific, for example, a sensor item with variance that is ten times the average of the variances of the measurement values of all the sensor items or more is not used.

This is because if the measurement value of the sensor item having exceptionally large variance is included in the output to the principal component calculating unit 13, that is, in the measurement value to be used for principal component calculation, a principal component reflecting only the influence of that sensor item may be calculated. For example, in the case of the air conditioner, the electronic expansion valve opening of the compressor unit or the cooling unit may correspond to such an item.

As described above, the sensor item for operation state classification selecting unit 12 selects a sensor item having measurement values that does not have an excessive influence in the principal component calculation, that is, a sensor item that enables more effective principal component calculation from the viewpoint of classification of operation states, from among the sensor items regarding the measurement values included in the sample output by the stable state extracting unit 16.

At this time, the sensor item for operation state classification selecting unit 12 is designed to assign, for example, a principal component calculation target flag to the sensor item so that the sensor item can be recognized as the selected sensor item, and output the sensor item to the principal component calculating unit 13. Note that this is only an example, and the sensor item may be recorded by any method to notify that the measurement value of the sensor item, out of sensor items regarding the measurement values included in a sample, is used for principal component calculation. Note that this is only an example, and it is enough for each of the sensor items regarding the measurement values included in the sample that whether the sensor item is the one whose measurement value is used for principal component calculation is recorded in some way.

Alternatively, it is assumed that a criterion as to which sensor item is not used for the principal component calculation is set in advance, and the sensor item for operation state classification selecting unit 12 selects the sensor item on the basis of the preset criterion. The present embodiment is not limited thereto as long as the sensor item for operation state classification selecting unit 12 can select the sensor item that does not have an extreme influence on the calculation of the principal component.

The sensor item for operation state classification selecting unit 12 shapes the sensor data as a sample for the principal component calculation by shaping the measurement value of the sensor item selected in step ST503 (step ST504). To be specific, the sensor item for operation state classification selecting unit 12 determines the sensor data shaping weight for each sensor item regarding the measurement value included in the sample input from the stable state extracting unit 16 in accordance with a distribution characteristic of the measurement values, and multiplies each measurement value by the sensor data shaping weight. Then, the sensor item for operation state classification selecting unit 12 outputs a sample including measurement values to the principal component calculating unit 13 as a post-shaping sample, each of the measurement values being multiplied by the sensor data shaping weight determined for each sensor item for each of the measurement values of the samples. At this time, the sensor item for operation state classification selecting unit 12 stores the determined sensor data shaping weight in the parameter for data classification storage unit 17 in association with the corresponding sensor item. That is, each sensor item stored by the sensor item for operation state classification selecting unit 12 in step ST503, and the sensor data shaping weight stored by the sensor item for operation state classification selecting unit 12 in step ST504 are stored in the parameter for data classification storage unit 17 in association with each other.

Here, the process of step ST504 will be described in detail.

Figure 7:
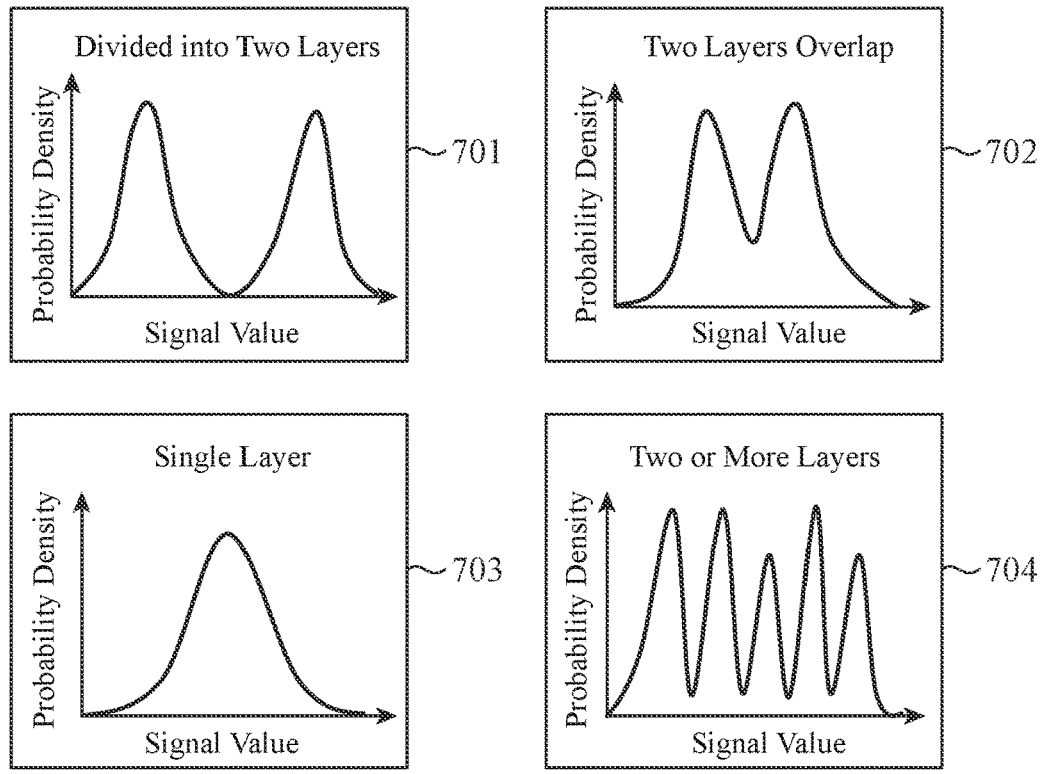
FIG. 7 shows diagrams illustrating examples of specific distribution characteristics of measurement values measured by sensors installed in an air conditioner in the first embodiment.

First, FIG. 7 illustrates examples of specific distribution characteristics of measurement values measured by a sensor installed in the air conditioner. The horizontal axis of each of 701 to 704 in FIG. 7 represents the signal values, that is, the measurement values by the sensor, and the vertical axis represents the probability density.

701 in FIG. 7 illustrates a probability density function of a case where the characteristics of the measurement values are divided into two layers in a certain sensor item.

In the air conditioner, the control details are determined according to the difference between the room temperature and a set temperature, and are roughly divided into two types of "operation with high power" and "operation with low power". In his case, as illustrated in 701 in FIG. 7, there is a sensor item having distribution that is clearly divided into the two layers of the "operation with high power" and "operation with low power".

In the case of the air conditioner, the degree of superheat of the cooling unit or the like exhibits such characteristics.

On the other hand, 702 in FIG. 7 illustrates a probability density function of a case where the distribution of the measurement values are divided into two layers but the two divided distributions overlap with each other.

The air conditioner has roughly two types of control details as described above. In 702 in FIG. 7, an influence of the control details appears, but distribution characteristics of a case where two distributions overlap with each other by a certain percentage or more is exhibited.

In the case of the air conditioner, a discharge temperature of a compressor, a piping temperature, or the like exhibits such characteristics.

Further, 703 in FIG. 7 illustrates a probability density function of a case where the distribution of the measurement values exhibits a single layer for a certain sensor item.

Among the sensor items of the air conditioner, there are some sensor items having control details that do not exhibit clear distribution characteristics as illustrated in 701 and 702 in FIG. 7. In such a case, there is a sensor item that exhibits a single layer of distribution although there is a bias in the distribution depending on the sensor item.

In the case of the air conditioner, a condensation temperature or the like exhibits such characteristics.

Further, 704 in FIG. 7 illustrates a probability density function of a certain sensor item in a case where distribution of the measurement values is divided into two or more layers.

This occurs, for example, when a pitch of a value measurable by a sensor is large.

In the case of an air conditioner, a set room temperature, and a capacity of cooling units that indicates the number of operating cooling units exhibit such characteristics.

The operation state classification apparatus 1 according to the first embodiment is provided for generating classification for classifying the sensor data including measurement values of multidimensional sensor items for each operation state. As illustrated in FIG. 7, the measurement values of the sensor items have respective characteristics, and in particular, by use of 701, 702, and 704 having characteristics in distribution as input data of the principal component calculating unit 13, classification of sensor data clearly corresponding to each operation state can be generated.

Therefore, the sensor item for operation state classification selecting unit 12 treats the measurement values of the sensor items as Gaussian mixture distribution, and determines, for each sensor item, a weight in accordance with the distribution characteristics, for the measurement values included in the sensor data as the sample to be output to the principal component calculating unit 13. The sensor item for operation state classification selecting unit 12 then shapes the sensor data by multiplying the measurement value of each sensor item by the weight for corresponding sensor item in accordance with the distribution characteristics.

Figure 8:
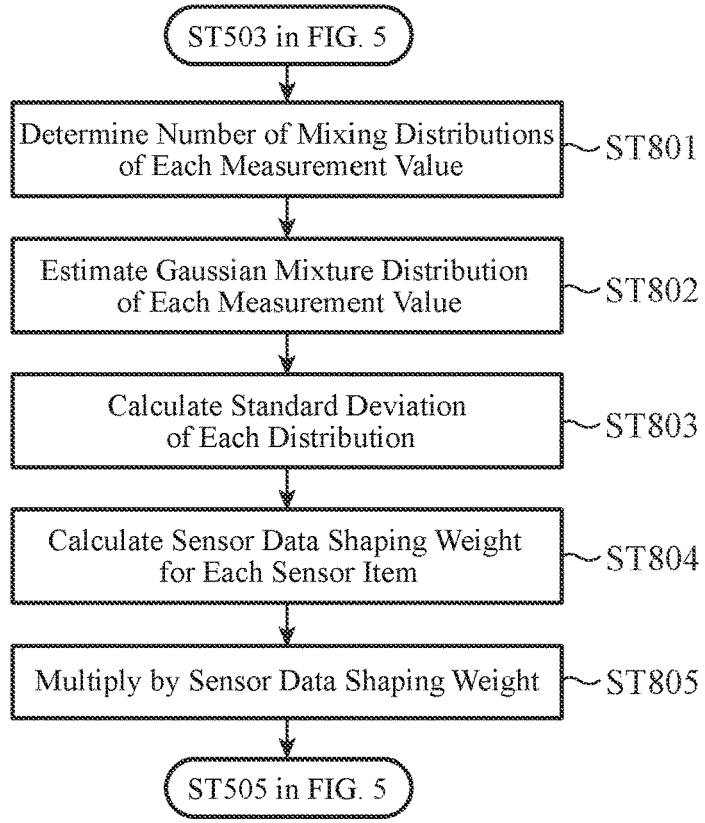
FIG. 8 is a flowchart illustrating an operation to determine a sensor data shaping weight for each sensor item and multiply sensor data of an appropriate sensor item by the sensor data shaping weight to shape the sensor data by a sensor item for operation state classification selecting unit in step ST504 in FIG. 5 in the first embodiment.

FIG. 8 is a flowchart illustrating an operation of the sensor item for operation state classification selecting unit 12 in step ST504 in FIG. 5 to shape the sensor data of samples for principal component calculation, more specifically, an operation to shape the sensor data by determining the sensor data shaping weight for each sensor item and multiplying the sensor data of the sensor item by the corresponding sensor data shaping weight.

Figure 9A:
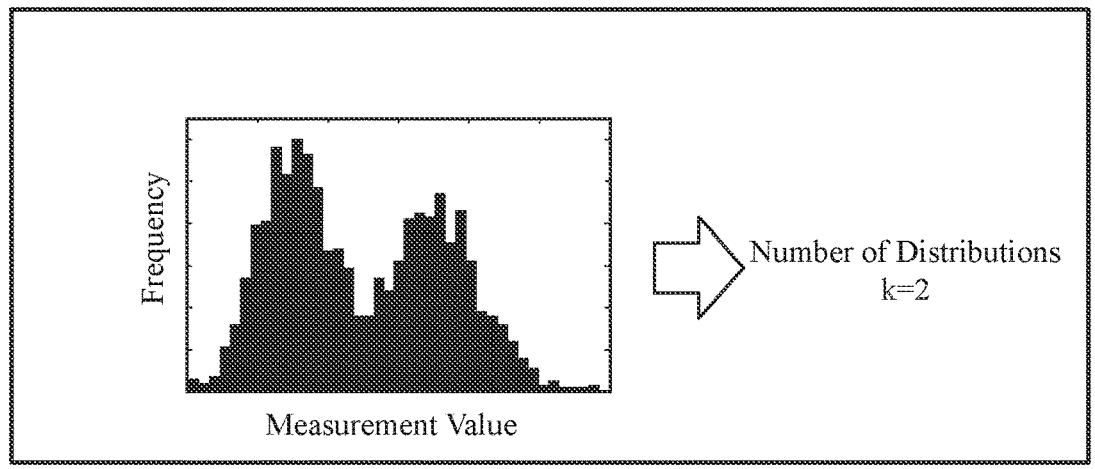
FIGS. 9A, 9B, and 9C are diagrams for describing each of the steps in FIG. 8 in the first embodiment.
Figure 9B:
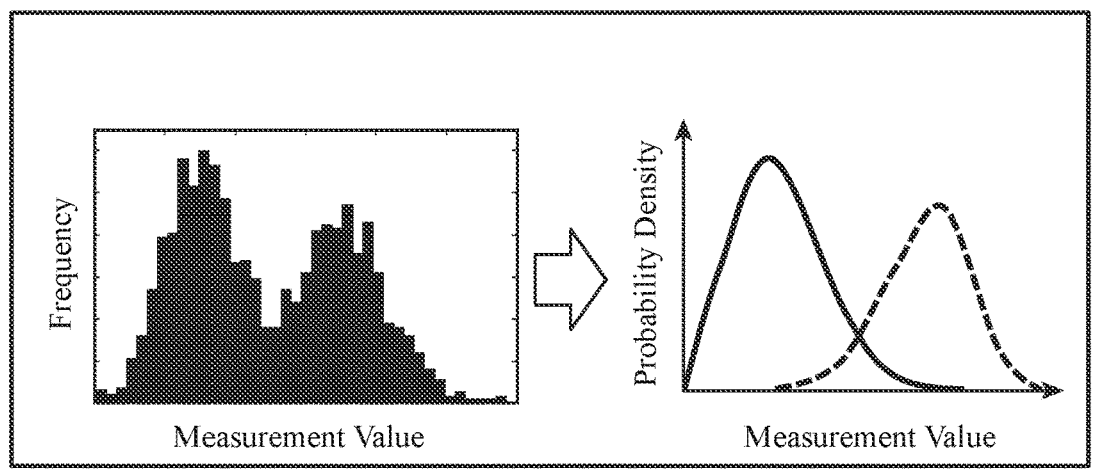
Figure 9C:
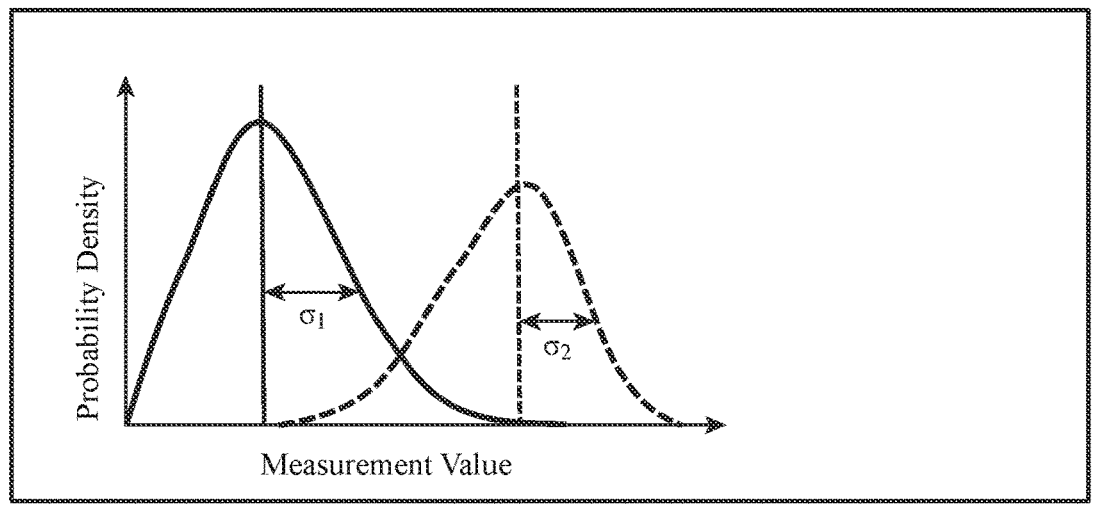

FIGS. 9A to 9C are diagrams for describing each of the steps in FIG. 8. Note that, here, the measurement values of a certain item are illustrated in FIGS. 9A to 9C, assuming that the measurement values have the characteristics in which the distribution of data is divided into two layers, and the two distributions overlap with each other, that is, the measurement values have the characteristics illustrated in 702 in FIG. 7.

First, the sensor item for operation state classification selecting unit 12 determines the number of mixing distributions of measurement values, about the same sensor item regarding the measurement values included in all the samples input from the stable state extracting unit 16 (step ST801). To be specific, the sensor item for operation state classification selecting unit 12 determines the number of mixing distributions k, for the distribution of the measurement values, using a known technique such as the gap statistic or an information amount criterion, for the measurement values of the same sensor item of all the samples input from the stable state extracting unit 16 (see FIG. 9A).

For example, in the example of FIG. 9A, the two distributions of the measurement values overlap with each other, and thus the number of distributions k=2 is obtained.

The sensor item for operation state classification selecting unit 12 estimates the Gaussian mixture distribution for each measurement value, for the number of distributions determined in step ST801 (step ST802). For the estimation of the Gaussian mixture distribution, the EM algorithm is used, for example (see FIG. 9B).

The sensor item for operation state classification selecting unit 12 calculates the standard deviation of the Gaussian mixture distribution of the measurement values estimated in step ST802 (step ST803). In a case of the Gaussian mixture distribution having a plurality of distributions of the measurement values, the sensor item for operation state classification selecting unit 12 calculates the standard deviation $\sigma_i$ (i=1, 2, . . . , k) for each distribution (see FIG. 9C).

The sensor item for operation state classification selecting unit 12 calculates the sensor data shaping weight of each sensor item, using the standard deviation of each distribution calculated in step ST803 (step ST804).

The process of calculating the sensor data shaping weight of each sensor item by the sensor item for operation state classification selecting unit 12 in step ST804 will be described below.

First, the sensor item for operation state classification selecting unit 12 calculates an average value of the standard deviations $\sigma_i$ of each distribution by the following expression (1).

$$\frac{\sum_{i=1}^{k} \sigma_i}{k} \tag{1}$$

k: the number of mixing distributions of the measurement values of a sensor item I
i: an index of the mixing distribution of the measurement values of the sensor item I
$\sigma_i$: the standard deviation of the distribution i
I: an index of a sensor item Note that the scale is different for each sensor item, and thus the sensor item for operation state classification selecting unit 12 divides the average value of the standard deviations $\sigma_i$ calculated by the above expression (1) by the width (max $(A_I)$–min $(A_I)$) of the vector A of the measurement value. The division by the (max $(A_I)$–min $(A_I)$) is a process for normalizing the average value of the standard deviations $\sigma_i$ to suppress a difference in weight due to the scale difference of each of the sensor items.

The expression for the normalization is described in the following expression (2).

$$\frac{\sum_{i=1}^{k} \sigma_i}{k} \div (\max(A_I) - \min(A_I)) = \frac{\sum_{i=1}^{k} \frac{\sigma_i}{\max(A_I) - \min(A_I)}}{k} \tag{2}$$

$A_I$: the vector of the sensor item I

The sensor item for operation state classification selecting unit 12 then employs a reciprocal of the average value of the standard deviations $\sigma_i$ after normalization as sensor data shaping weight $\alpha_I$ of the sensor item I (I=1, 2, . . . , k (k: the number of sensor items to be output to the principal component calculating unit 13)). The calculation expression is described in the following expression (3).

$$\alpha_I = \frac{k}{\sum_{i=1}^{k} \left( \frac{\sigma_i}{(\max(A_I) - \min(A_I))} \right)} \tag{3}$$

$\alpha_I$: the sensor data shaping weight of the sensor item I

By determining the sensor data shaping weight of each sensor item as shown in the above expression (3), the weight of the sensor item in which the standard deviation of each of the mixture distributions is small, that is, the sensor item in which the distribution characteristics are clearly different to each other in accordance with the respective operation states, among the distribution illustrated in 701, 702, and 704 in FIG. 7, can be set to be large. This method enables calculation of the principal component in consideration of the distribution characteristics, and efficient classification of the operation states.

The sensor item for operation state classification selecting unit 12 shapes the measurement value by multiplying the vector $A_I$ representing the measurement value of each sensor item selected in step ST503 of FIG. 5 by the sensor data shaping weight $α_I$ of each sensor item calculated in step ST804 and outputs the sensor data as a sample with the shaped measurement values to the principal component calculating unit 13 (step ST805).

Next, an explanation with reference to the flowchart of FIG. 5 will be continued.

The principal component calculating unit 13 acquires the sensor data as a sample with the shaped measurement values, which is output by the sensor item for operation state classification selecting unit 12 in step ST504, and calculates the principal components of the plurality of samples (step ST505). To be specific, the principal component calculating unit 13 calculates the principal component by obtaining an expression expressing the principal component as the expression (4) below, using the measurement values of the sensor items with a principal component calculation target flag being turned ON, out of the measurement values included in the sample acquired from the sensor item for operation state classification selecting unit 12. An expression representing a principal component can be obtained using a multivariate analysis method such as the singular value decomposition, for example.

$$U=αA+βB+γC+\ldots \quad (4)$$

In the expression (4), U is the principal component, A, B, C . . . are post-shaping measurement values of the respective sensor items included in the sensor data, as the post-shaping sample, which is output by the sensor item for operation state classification selecting unit 12 in step ST504, and α, β, γ, . . . are the principal component calculation weights respectively corresponding to the sensor items. The principal component calculating unit 13 calculates the principal component calculation weights in the principal component calculation expression.

Then, the principal component calculating unit 13 can calculate a principal component value of each sample or sensor data, using the expression expressing the principal component in which principal component calculation weights are determined.

That is, the principal component calculating unit 13 can calculate the principal component value of each sample by multiplying the post-shaping measurement values of the sensor items with the principal component calculation target flag being turned ON by the corresponding principal component calculation weights, respectively, for each sample, according to the expression (4).

The principal component calculating unit 13 outputs the expression expressing the principal component of the sample calculated in this step ST505 to the operation state classification unit 14. At this time, the principal component calculating unit 13 associates the sample output from the sensor item for operation state classification selecting unit 12 with the principal component value of the sample and outputs the associated sample and value to the operation state classification unit 14.

Further, the principal component calculating unit 13 stores the principal component calculation weights used in the expression expressing the principal component in the parameter for data classification storage unit 17 in association with the corresponding sensor items. That is, each sensor item stored by the sensor item for operation state classification selecting unit 12 in step ST503, the sensor data shaping weight stored by the sensor item for operation state classification selecting unit 12 in step ST504, and the principal component calculation weight stored by the principal component calculating unit 13 in this step ST505 are stored in the parameter for data classification storage unit 17 in association with one another.

The operation state classification unit 14 generates classification for each operation state, on the basis of the principal component of the sample calculated and output by the principal component calculating unit 13 in step ST505, and the physical quantity to be used for failure determination calculated and output by the physical quantity for failure determination calculating unit 11 in step ST502 (step ST506), that is, the physical quantity for failure determination. Note that the information used by the operation state classification unit 14 to generate the classification of the operation state includes the principal component obtained by the principal component calculating unit 13 in step ST505 and the information of the principal component values of each of the samples.

Here, the process of step ST506 will be described in detail.

Figure 10:
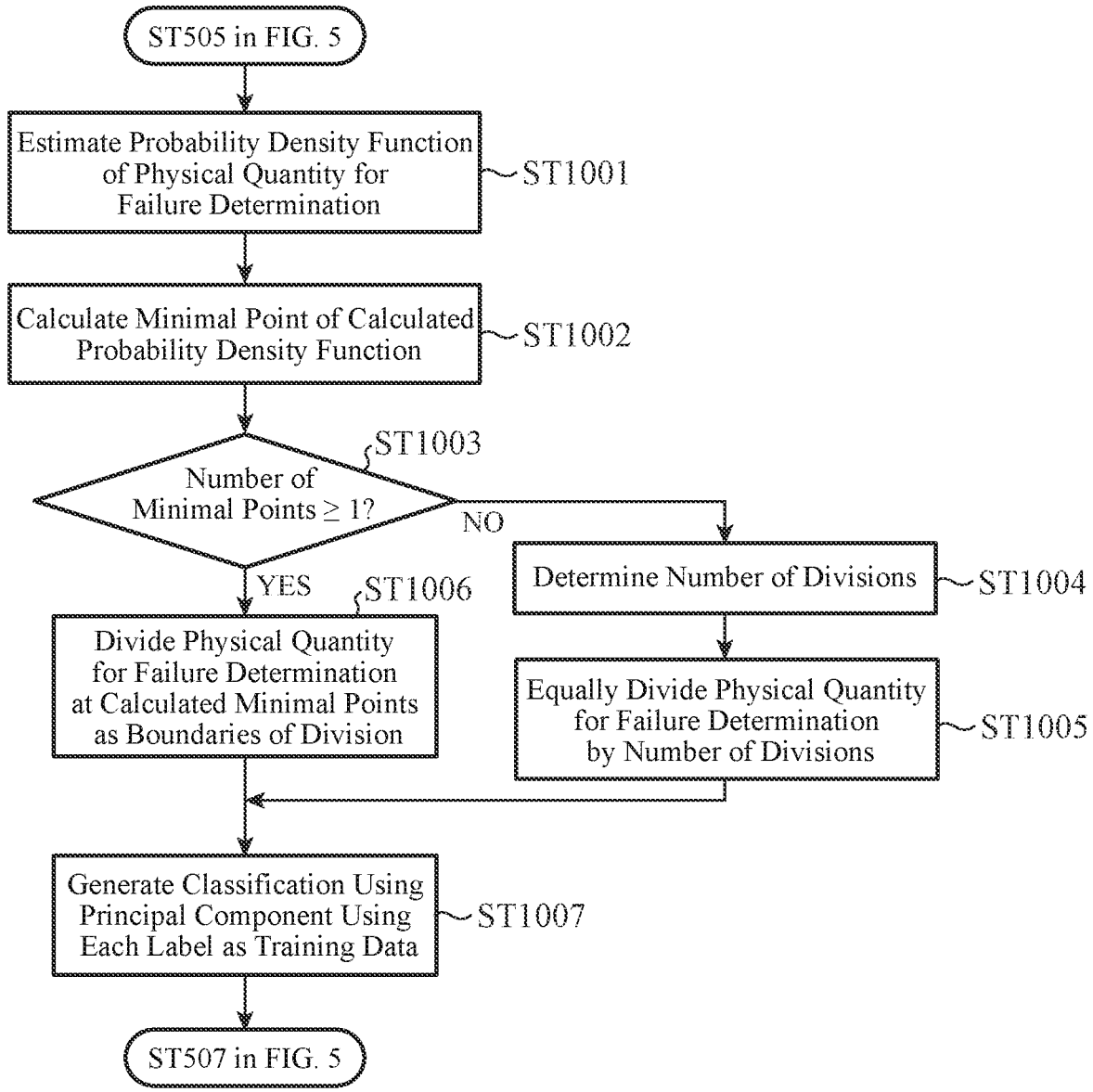
FIG. 10 is a flowchart for describing an operation to generate classification for each operation state by an operation state classification unit in step ST506 in FIG. 5 in the first embodiment.

FIG. 10 is a flowchart describing an operation to generate classification for each operation state by the operation state classification unit 14 in step ST506 in FIG. 5.

FIGS. 11A to 11D are diagrams exemplarily illustrating an operation of dividing the physical quantity for failure determination by the operation state classification unit 14.

Figure 11A:
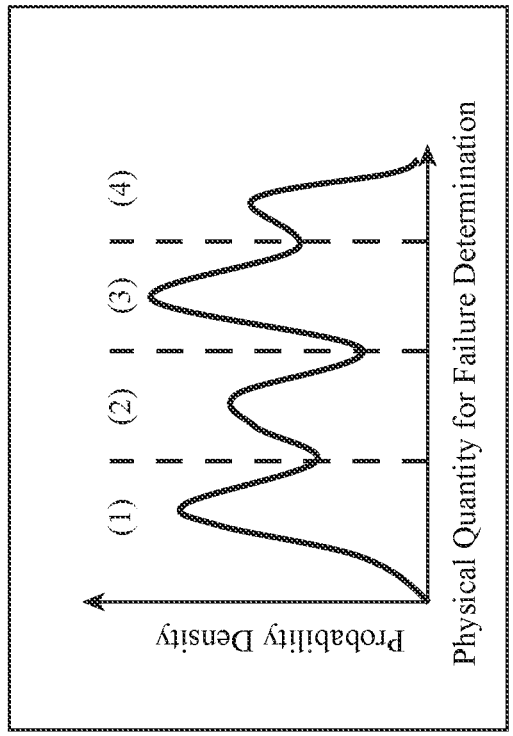
FIGS. 11A to 11D are diagrams exemplarily illustrating an operation to divide physical quantities for failure determination by the operation state classification unit in the first embodiment.

The operation state classification unit 14 estimates the probability density function of the physical quantities for failure determination calculated and output by the physical quantity for failure determination calculating unit 11 in step ST502 in FIG. 5 (step ST1001) (see FIG. 11A).

To be specific, the operation state classification unit 14 estimates the probability density function for the physical quantities for failure determination respectively corresponding to the samples output from the physical quantity for failure determination calculating unit 11. Note that the operation state classification unit 14 uses the EM algorithm, for example, for estimating the probability density function.

Figure 11C:
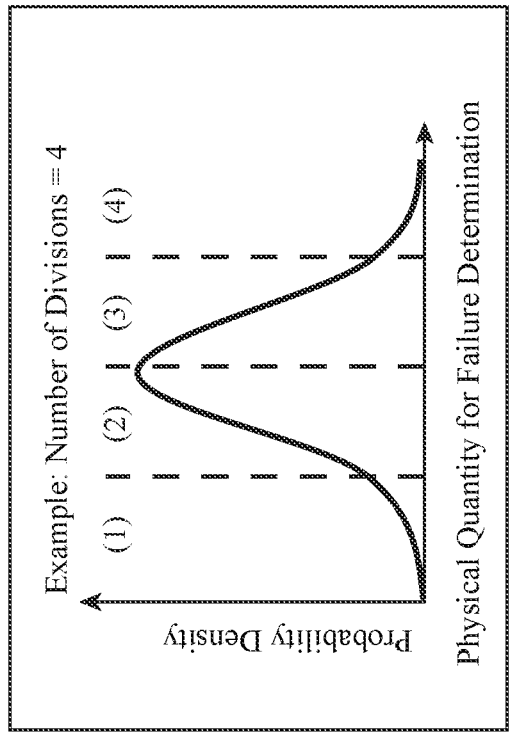
Figure 11B:
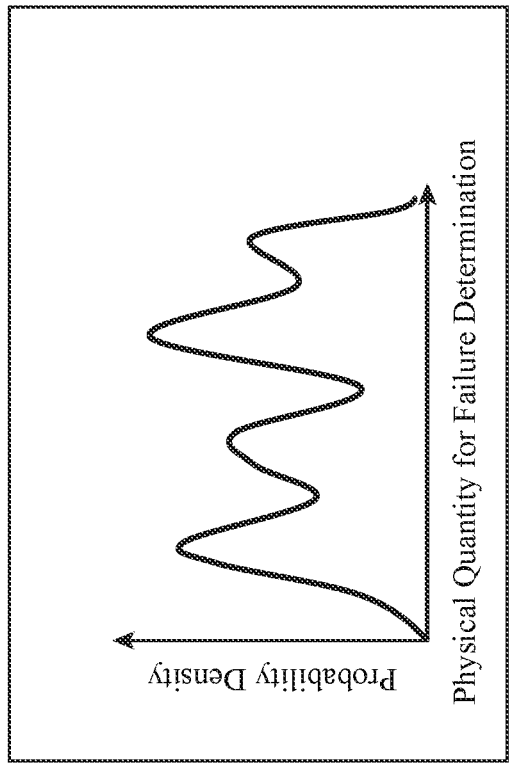
Figure 11D:
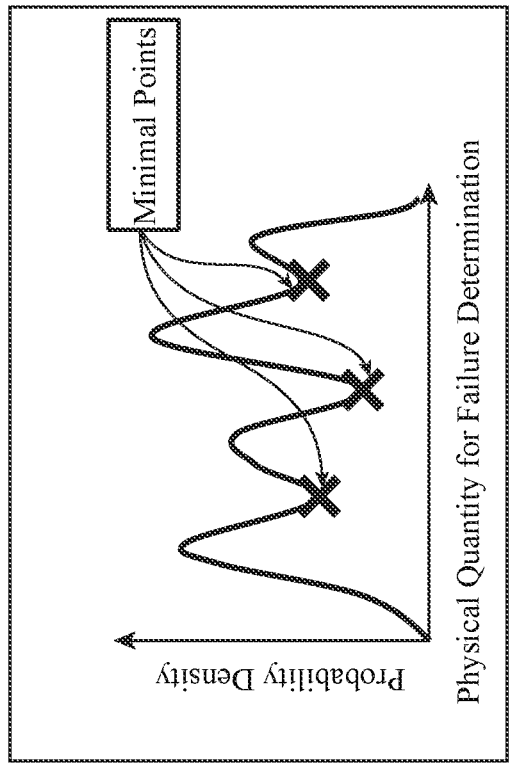

The operation state classification unit 14 calculates a minimal point of the probability density function estimated in step ST1001 for the physical quantity for failure determination calculated and output by the physical quantity for failure determination calculating unit 11 in step ST502 in FIG. 5 (step ST1002) (see FIG. 11B).

Note that, in a case where the physical quantity for failure determination calculating unit 11 stores the calculated physical quantities for failure determination in a physical quantity for failure determination storage unit (not illustrated) in steps ST1001 and ST1002, the operation state classification unit 14 may extract an appropriate physical quantity for failure determination, that is, the physical quantity for failure determination matched with the collection dates and times of the samples, by reference to the physical quantity for failure determination storage unit, estimate the probability density function, and calculate the minimal points of the estimated probability density function.

The operation state classification unit 14 determines whether the number of the minimal points calculated in step ST1002 is one or more (step ST1003).

In step ST1003, when the number of the minimal points is one or more ("YES" in step ST1003), the operation state classification unit 14 divides a range of the physical quantity for failure determination into a plurality of ranges at the minimal points calculated in step ST1002 as boundaries of division, and labels the divisions of the physical quantity for failure determination by numbering them in the ascending order of the physical quantities for failure determination (step ST1006) (see (1) to (4) in FIG. 11C).

In step ST1003, when the number of the minimal points is not one or more ("NO" in step ST1003), that is, in a case where there is no minimal point, the operation state classification unit 14 determines the number of divisions, using a method to determine the number of divisions, such as a gap statistic or an information amount criterion (step ST1004), equally divides the range of values of the physical quantity for failure determination by the number of divisions determined in step ST1004, and labels the divisions of the physical quantity for failure determination by numbering them with the division numbers in the ascending order of the physical quantity for failure determination (step ST1005). For example, assuming that the number of divisions is determined to be 4 in step ST1004, the operation state classification unit 14 equally divides the range of values of the physical quantity for failure determination into four divisions in step ST1005, and labels the divisions with the division numbers (see (1) to (4) in FIG. 11D).

The operation state classification unit 14 generates classification using the principal components of the samples output by the principal component calculating unit 13 in step ST505 in FIG. 5, using known supervised machine learning such as the support vector machine (SVM) or the Naive Bayes classifier, using the labels assigned at step ST1006 or ST1005 as training data (step ST1007). To be specific, the operation state classification unit 14 sets the samples classified into the same cluster by machine learning as a group of the same operation state, classifies the principal components, using ranges of the principal component values of the samples belonging to each operation state, and assigns different operation state numbers to the respective classifications. By his process, the classification of each operation state associated with the range of the principal component is generated using the principal component and the physical quantity for failure determination of the sensor data as a sample.

At this time, the operation state classification unit 14 stores the range of the principal component in each operation state number in the parameter for data classification storage unit 17 in association with the operation state number.

Here, FIG. 12 is a diagram for describing examples of data stored in the parameter for data classification storage unit 17 in the first embodiment.

As illustrated in FIG. 12, the parameter for data classification storage unit 17 stores information (A) regarding the sensor items to be used for principal component calculation, and the sensor data shaping weights and the principal component calculation weights of the sensor items, which are stored in steps ST503 to ST505, and information (B) regarding the ranges of the principal components of the operation state numbers 1, 2, 3, ..., which is stored by the operation state classification unit 14 in step ST1007.

Next, an explanation with reference to the flowchart of FIG. 5 will be continued again.

The operation state classification unit 14 further assigns the operation state numbers to the samples and classifies the samples, on the basis of the principal component values of the samples and the generated classification in step ST1007 in FIG. 10, and accumulates the samples provided with the operation state numbers to the post-classification sensor data accumulation DB 15 as post-classification sensor data (step ST507). The post-classification sensor data accumulation DB 15 accumulates the sensor data as the samples output from the operation state classification unit 14.

FIG. 13 is a diagram for describing examples of the sensor data as samples accumulated in the post-classification sensor data accumulation DB 15 in the first embodiment. In the post-classification sensor data accumulation DB 15, each of the samples or the measurement values of the sensor data are accumulated together with the data illustrated in FIG. 13, but illustration thereof is omitted.

As illustrated in FIG. 13A, the post-classification sensor data accumulation DB 15 accumulates the date and time data of each sample in association with the operation state number assigned in step ST1007 of FIG. 10. Further, the physical quantity for failure determination of each sample is also accumulated. Since the physical quantity for failure determination calculating unit 11 outputs the collection date and time and the physical quantity for failure determination of the sample in association with each other in step ST502 of FIG. 5, the physical quantity for failure determination of each sample may be specified from the collection date and time of the sample.

Note that FIG. 13A illustrates an example of details of the post-classification sensor data accumulation DB 15, assuming a case where the number of failure to be determined is one, such as filter clogging.

For example, in a case where there is a plurality of numbers of failures to be determined, such as filter clogging and the quantity of refrigerant, the physical quantity for failure determination calculating unit 11 calculates the respective physical quantities to be used for failure determination in step ST502. Then, in step ST506, the operation state classification unit 14 generates respective classifications of the operation states, using the respective physical quantities for failure determination, and assigns the operation state numbers for the respective physical quantities for failure determination, for each sample. As illustrated in FIG. 13B, the post-classification sensor data accumulation DB 15 accumulates each sample such that the operation state numbers corresponding to the respective physical quantities for failure determination can be recognized.

Next, an explanation with reference to the flowchart of FIG. 5 will be continued again.

The operation state classification unit 14 stores monitoring group information that defines which post-classification sensor data of the group with the operation state number should be monitored for the respective failures to be determined, that is, monitoring group information that defines the operation state in which the physical quantity for failure determination corresponding to the failure to be determined is to be monitored (step ST508).

To be specific, the operation state classification unit 14 stores the label assigned for each division of the physical quantity for failure determination divided in step ST1006 or ST1005 in FIG. 10, and the operation state number assigned, using the label as the training data in step ST1007, in a database inside or outside the operation state classification apparatus 1 or the like, in association with information of failure to be determined, as the monitoring group information.

For example, when detection of the filter clogging is desired, the operation state number, which is classified using the label assigned with respect to the fan frequency being a physical quantity for failure determination as training data, is set to a monitoring object, and the operation state number and the information indicating that the failure details to be determined is the "filter clogging" are stored in association with each other in the database inside or outside the operation state classification apparatus 1 or the like, as the monitoring group information.

Next, the "operation to assign an operation state number to and classify a continuously collected sample or sensor data after generation of classification" will be described along the flowchart of FIG. 14.

Figure 14:
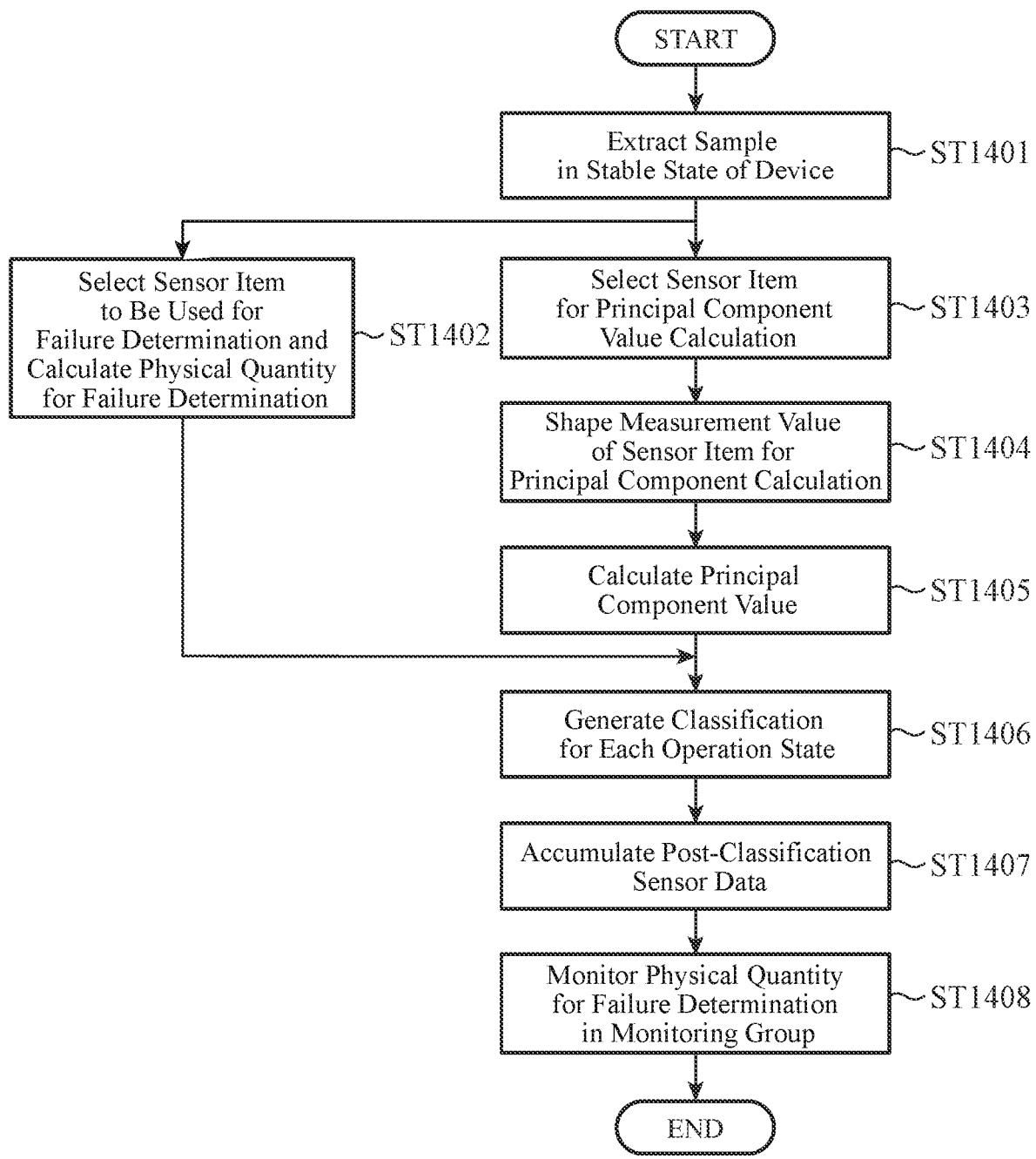
FIG. 14 is a flowchart for describing an operation to classify continuously collected samples after the first operation of the operation state classification apparatus according to the first embodiment of the present invention.

FIG. 14 is a flowchart for describing an operation of the operation state classification apparatus 1 according to the first embodiment of the present invention to classify continuously collected samples after the first operation.

In FIG. 14, operations of steps ST1401, ST1402, and ST1407 are similar to the operations of steps ST501, ST502, and ST507 in FIG. 5, respectively, and thus redundant description is omitted. Here, only operations of steps ST1403 to ST1406 and step ST1408, which are different from the "operation to generate classification for each operation state using collected samples at the first time" described in FIG. 5, will be described.

In step ST1403, the sensor item for operation state classification selecting unit 12 selects the sensor item stored in the parameter for data classification storage unit 17 as the sensor item to be used for principal component value calculation of the sample, by reference to the parameter for data classification storage unit 17. That is, the sensor item that is the same as the sensor item selected at the first operation (step ST503 in FIG. 5) is selected as the sensor item to be used for principal component calculation. At this time, the sensor item for operation state classification selecting unit 12 gives a principal component calculation target flag to the corresponding sensor item.

In step ST1404, the sensor item for operation state classification selecting unit 12 shapes the measurement value of the sensor item selected in step ST1403, for the principal component calculation, using the sensor data shaping weight stored in the parameter for data classification storage unit 17. To be specific, the sensor item for operation state classification selecting unit 12 specifies, for each sensor item regarding the measurement value included in the sample input from the stable state extracting unit 16, the corresponding sensor data shaping weight from the parameter for data classification storage unit 17 and multiplies the measurement value by the sensor data shaping weight. That is, the sensor data shaping weight calculated at the first operation is used for sensor data shaping.

The sensor item for operation state classification selecting unit 12 then outputs each post-shaping sample, which is obtained by multiplying each measurement value included in the sample by the sensor data shaping weight determined for each sensor item, to the principal component calculating unit 13.

In step ST1405, the principal component calculating unit 13 acquires the post-shaping samples, which are output from the sensor item for operation state classification selecting unit 12 in step ST1404, and calculates the principal component value of each sample.

Calculation of the principal component value may be performed using the following expression (5) that expresses the principal component.

$$U = \alpha A' + \beta B' + \gamma C' \ldots \quad (5)$$

In the expression (5), U is the principal component, A', B', C', . . . are post-shaping measurement values included in the post-shaping sample output by the sensor item for operation state classification selecting unit 12 in step ST1404, and α, β, γ, . . . are the principal component calculation weights respectively corresponding to the sensor items, and are the values stored in the parameter for data classification storage unit 17 at the first operation.

The principal component calculating unit 13 calculates the principal component value of each sample by multiplying the post-shaping measurement values of the sensor items whose principal component calculation target flag is turned ON by the corresponding principal component calculation weights, for each sample, according to the expression (5).

The principal component calculating unit 13 outputs the calculated principal component value of the sample to the operation state classification unit 14. At this time, the principal component calculating unit 13 associates the sample output from the sensor item for operation state classification selecting unit 12 with the principal component value of each sample and outputs them to the operation state classification unit 14.

In step ST1406, the operation state classification unit 14 classifies the sample for each operation state on the basis of the principal component value of the sample calculated and output by the principal component calculating unit 13 in step ST1405, and the information of the range of the principal component stored in the parameter for data classification storage unit 17. To be specific, in which range stored in the parameter for data classification storage unit 17 the principal component value calculated by the principal component calculating unit in step ST1405 is included is determined, and the operation state number of the range determined to include the principal component value is assigned to the sample as the operation state number to classify the sample.

Then, the operation state classification unit 14 accumulates the sensor data to which the operation state number is assigned as the sample, as post-classification sensor data, in the post-classification sensor data accumulation DB 15, for each sample (step ST1407).

There is a problem that the operation state classification may vary every time if selection of the sensor item to be used for the principal component calculation, calculation of the sensor data shaping weight, change of the principal component calculation weight, and the like are performed for the continuously collected samples every time they are collected, after the classification for each operation state is generated using the collected samples and the samples are classified once. In addition, since the physical quantity for failure determination is used for the operation state classification, there is a problem that the physical quantity for failure determination representing failure is disadvantageously used for classification generation when the failure occurs. If the physical quantity for failure determination at the time of failure is used for classification of the operation state, there may be a situation where the samples that are supposed to be classified into the same operation state classification are classified into different operation states, and thus performing comparison of the physical quantities for failure determination in the same operation state, which is an inherent object of the present invention, becomes impossible.

For this reason, as described with reference to FIG. 13, in the "operation to assign an operation state number to and classify a continuously collected sample or sensor data after generation of classification", calculation of the principal component value is performed using the sensor item for principal component calculation, the sensor data shaping weight, and the principal component calculation weight, which are used in the "operation to generate classification for each operation state using collected samples at the first time", and classification of samples is performed on the basis of the range of the principal component, which is stored in the "operation to generate classification for each operation state using collected samples at the first time".

Note that, in the "operation to assign an operation state number to and classify a continuously collected sample or sensor data after generation of classification", selection of the sensor item to be used for failure determination, and calculation operation of physical quantity (step ST1402 in FIG. 14) are performed on continuously collected samples. This is to compare the physical quantity for failure determination with the physical quantity for failure determination at the first operation and to use the physical quantity for failure determination for monitoring the operation state, such as failure detection of the monitoring object 3, rather than to generate classification for each operation state using the physical quantity for failure determination.

In step ST1408, a manager or the like of a facility such as a building monitors the operation state, such as deterioration or failure of the monitoring object 3, on the basis of the post-classification sensor data accumulated in the post-classification sensor data accumulation DB 15 of the operation state classification apparatus 1. To be specific, the manager or the like of a facility such as a building specifies a desired timing such as once a month. When the desired timing comes, the operation state number to be monitored is motored by specifying the operation state number to be monitored on the basis of the monitoring group information, and extracting the sample of the specified operation state number by reference to the post-classification sensor data accumulation DB 15.

For example, it is assumed that the failure to be determined is "filter clogging", and the "filter clogging" and the group of the operation state number 18 are stored in association with each other in the monitoring group information. Further, it is assumed that the details accumulated in the post-classification sensor data accumulation DB 15 are those illustrated in FIG. 13A. The manager or the like extracts the samples with the operation state classification number 18 and arranges the samples in time-series order. In this case, samples of 2007/7/25 3:50:32, 2007/7/25 3:52:31, and 2007/7/25 4:00:29 are extracted.

Then, the manager or the like checks the physical quantities for failure determination of the extracted three samples. In this case, the physical quantities for failure determination are 100 Hz, 102 Hz, and 180 Hz, respectively, and the fan frequency that is the physical quantity for failure determination apparently has a large value at the time of 2007/7/25 4:00:29. From this fact, the manager or the like can specify that "filter clogging" occurs in the monitoring object 3.

As described above, by generating the classification of the sensor data for each operation state using the principal component and the physical quantity for failure determination, classification of the operation state, which is effective for failure detection, and in which variance of the physical quantities for failure determination in the classification of the same operation state is suppressed, can be generated.

That is, by classifying the samples or the sensor data on the basis of this classification, only the sample or the sensor data in the operation state suitable for detection of failure to be determined can be extracted. Then, by monitoring the physical quantity for failure determination included in the extracted sample or the like, whether change of the physical quantity for failure determination is due to failure of the device or due to change of the operation state can be distinguished and grasped and efficient monitoring can be performed.

Note that, in the above description, the operation to calculate the physical quantity for failure determination by the physical quantity for failure determination calculating unit 11 (step ST502 in FIG. 5 or step ST1402 in FIG. 14) and the operations to select the sensor item for principal component calculation and to shape the sensor data by the sensor item for operation state classification selecting unit 12 (steps ST503 and ST504 in FIG. 5, or steps ST1403 and ST1404 in FIG. 14) are performed in parallel. However, the present embodiment is not limited thereto. The operation in step ST503 (step ST1403) may be performed after the operation in step ST502 (step ST1402). It is enough for this operation that the calculation of the physical quantity for failure determination and shaping of the sensor data are completed when classification for the operation state is performed by the operation state classification unit 14 (step ST506 in FIG. 5 or step ST1406 in FIG. 14).

Further, in this first embodiment, as an example, when the user sets "filter clogging" of the air conditioner as the object for failure detection, it is assumed that only one item of the fan frequency is stored as the sensor item having the highest correlation with "filter clogging" in the device information DB 22. However, the number of the sensor items having highest correlation with the failure to be detected is not limited to one. For example, the sensor item having highest correlation with "filter clogging" may be two items of the fan frequency and the wind outlet temperature. In this case, the physical quantity for failure determination calculating unit 11 extracts the measurement values regarding the fan frequency and the wind outlet temperature from the sensor data accumulation DB 21 or the extracted sample in a stable state as the physical quantities for failure determination, and the operation state classification unit 14 may calculate the minimal points of the probability density function in which the physical quantities for failure determination are integrated, and divide the physical quantities for failure determination at the minimal points as boundaries of division.

Figure 15:
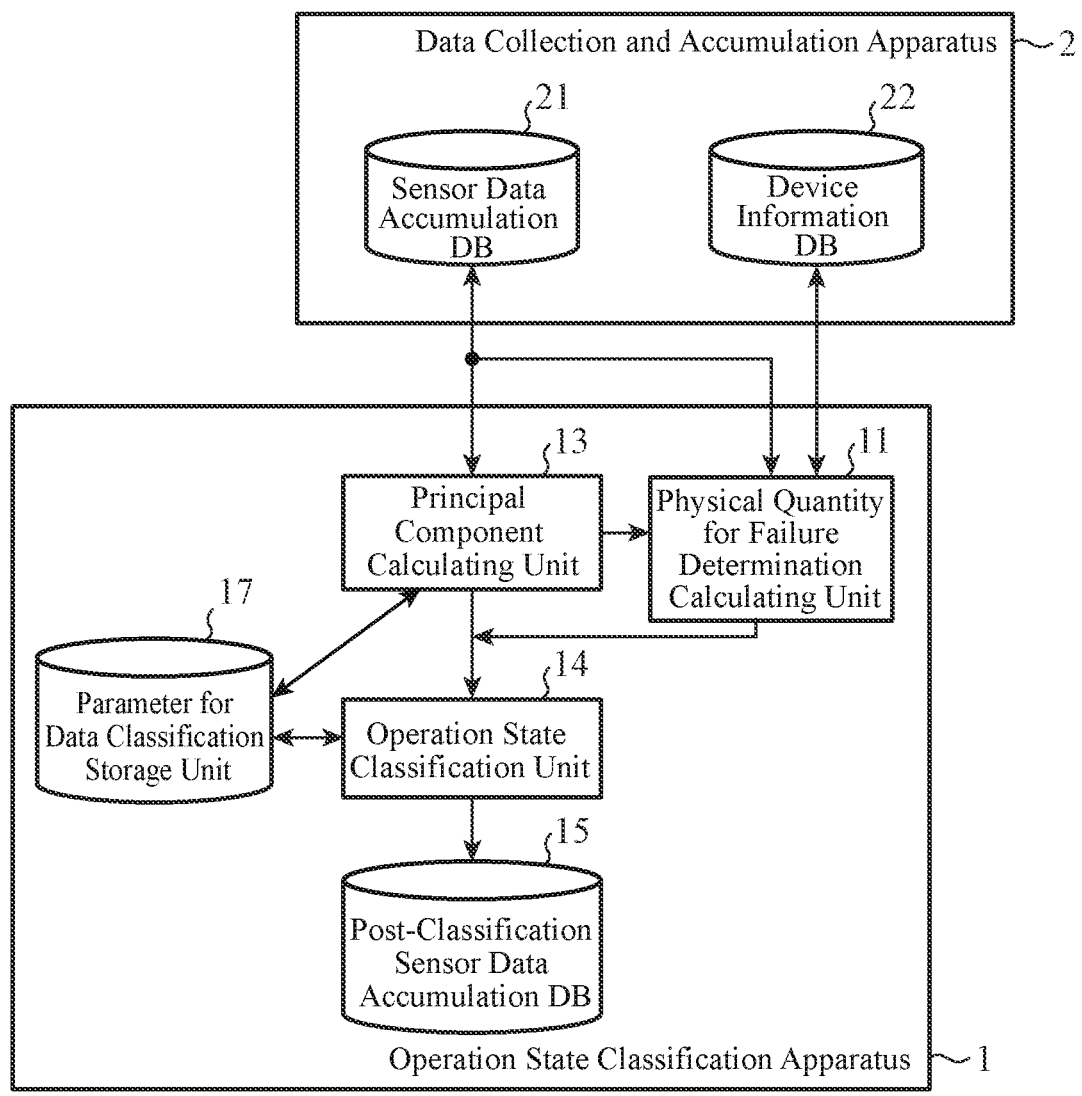
FIG. 15 is a diagram illustrating a configuration in which the operation state classification apparatus does not include the sensor item for operation state classification selecting unit and the stable state extracting unit in the first embodiment.

Further, in the first embodiment, it is assumed that the operation state classification apparatus 1 includes the stable state extracting unit 16 and the sensor item for operation state classification selecting unit 12. However, the operation state classification apparatus 1 may be designed not to include the stable state extracting unit 16 and the sensor item for operation state classification selecting unit 12. That is, the principal component calculating unit 13 may directly obtain the samples from the sensor data accumulation DB 21, and calculate the principal components or the principal component values of each sample without performing both extraction of samples in a stable state and shaping of the samples, and the physical quantity for failure determination calculating unit 11 may calculate the physical quantity for failure determination, directly using the measurement values included in the samples acquired by the principal component calculating unit 13 (see FIG. 15).

Figure 16:
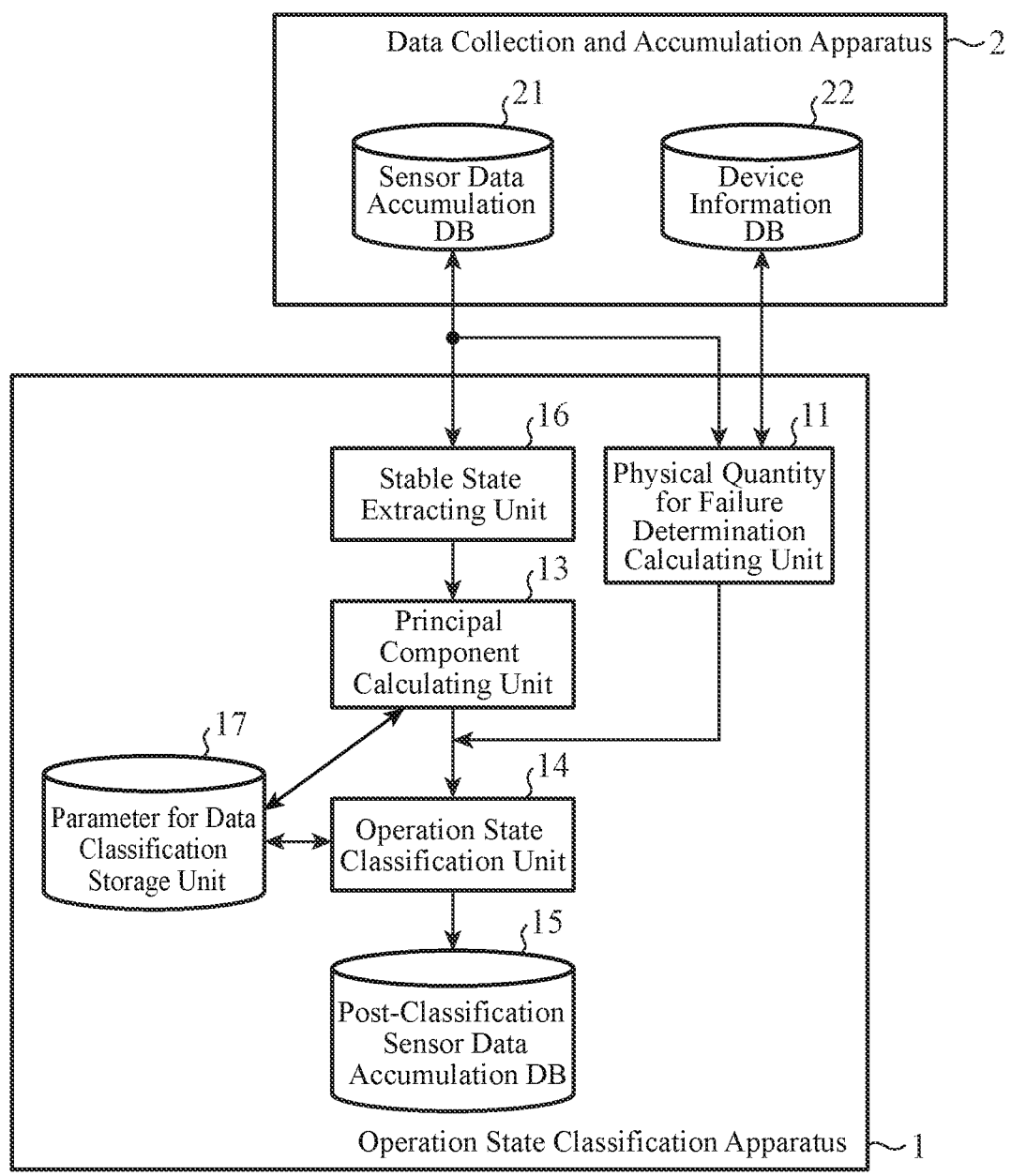
FIG. 16 is a diagram illustrating a configuration in which the operation state classification apparatus does not include the sensor item for operation state classification selecting unit in the first embodiment.

Alternatively, a configuration not provided with only the sensor item for operation state classification selecting unit 12 may be employed, and the principal component calculating unit 13 may perform the calculation of the principal component of the sample in a stable state or calculation of the principal component values of each sample, the sample having been extracted by the stable state extracting unit 16 (see FIG. 16).

If only the sample in a stable state extracted by the stable state extracting unit 16 is used for the calculation of the principal component or calculation of the principal component value of each sample, and the classification for the operation state is generated on the basis of the calculated principal component or the like, the operation states can be classified with higher accuracy than the case of the configuration without the stable state extracting unit 16.

Figure 17:
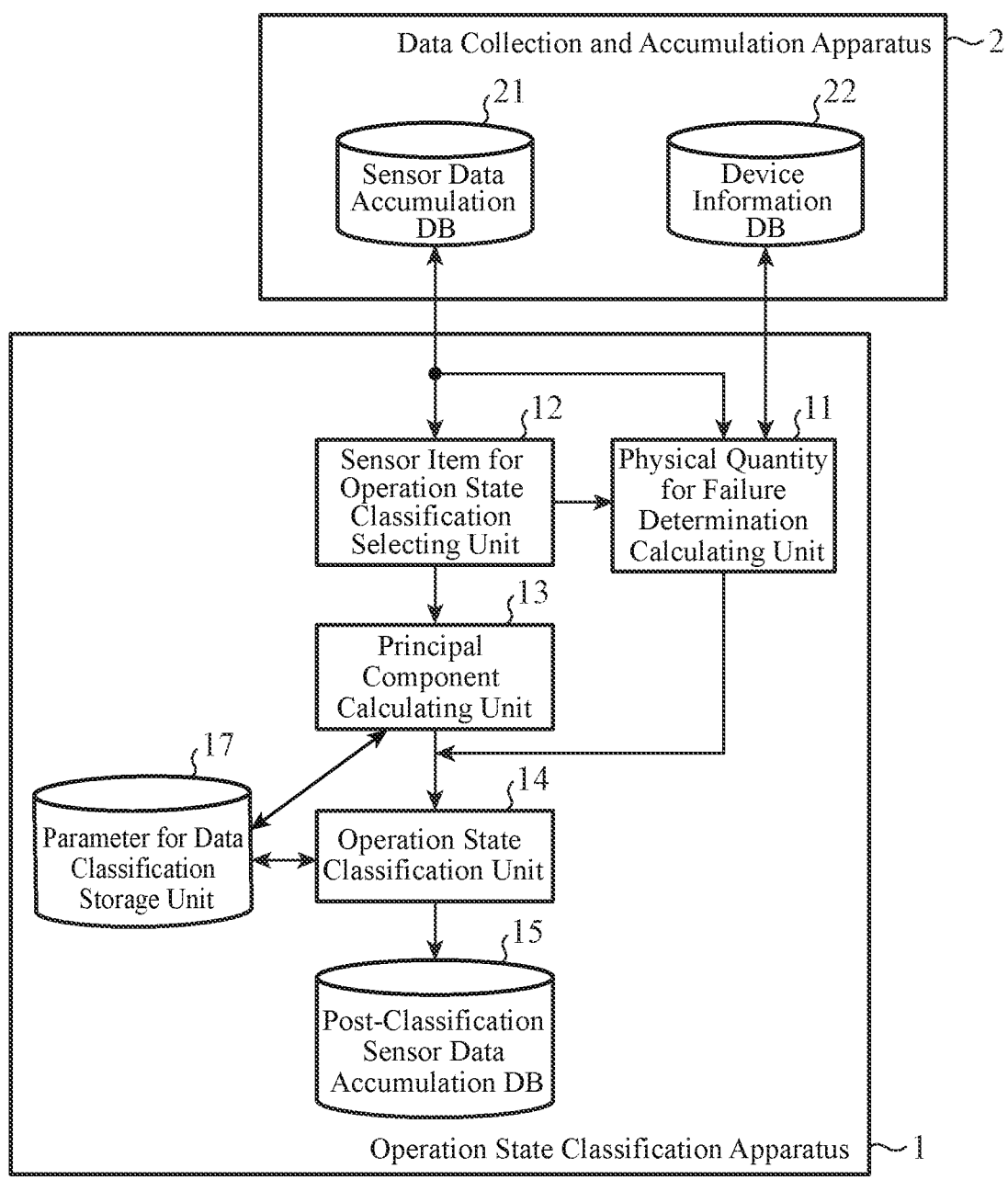
FIG. 17 is a diagram illustrating a configuration in which the operation state classification apparatus does not include the stable state extracting unit in the first embodiment.

Alternatively, a configuration not provided with only the stable state extracting unit 16 may be employed, and the sensor item for operation state classification selecting unit 12 may directly acquire samples from the sensor data accumulation DB 21 and select and store the sensor item to be used for principal component calculation, from among the sensor items of the samples accumulated in the sensor data accumulation DB 21, and the physical quantity for failure determination calculating unit 11 may calculate the physical quantities for failure determination for the samples acquired by the sensor item for operation state classification selecting unit 12 (see FIG. 17).

The sensor item for operation state classification selecting unit 12 selects the sensor item to be used for principal component calculation, from among the sensor items of the samples acquired from the sensor data accumulation DB 21, thereby performing more efficient principal component calculation than a case of a configuration without the sensor item for operation state classification selecting unit 12, generating more effective classification, and classifying the operation states with higher accuracy.

Figure 18A:
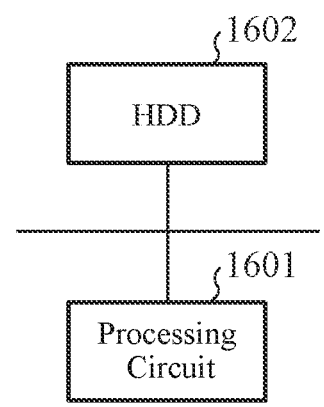
FIGS. 18A and 18B are diagrams illustrating examples of hardware configurations of the operation state classification apparatus according to the first embodiment of the present invention.
Figure 18B:
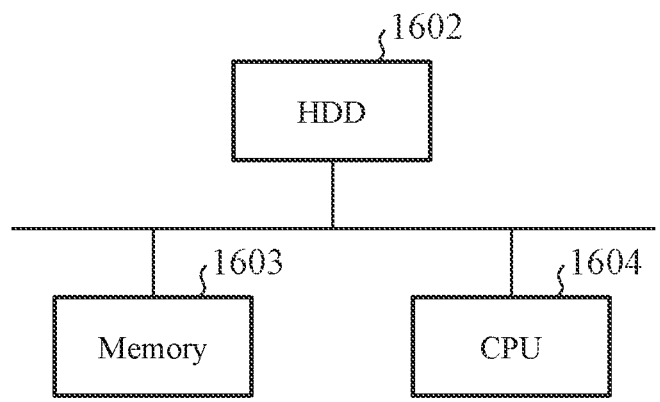

FIGS. 18A and 18B are diagrams illustrating examples of hardware configurations of the operation state classification apparatus 1 according to the first embodiment of the present invention.

In the first embodiment of the present invention, functions of the physical quantity for failure determination calculating unit 11, the sensor item for operation state classification selecting unit 12, the principal component calculating unit 13, the operation state classification unit 14, and the stable state extracting unit 16 are realized by a processing circuit 1601. That is, the operation state classification apparatus 1 includes the processing circuit 1601 for calculating the principal component from the sample and classifying the operation states.

The processing circuit 1601 may be dedicated hardware as illustrated in FIG. 18A or may be a CPU 1604 that executes a program stored in a memory 1603 as illustrated in FIG. 18B.

In a case where the processing circuit 1601 is dedicated hardware, the processing circuit corresponds to, for example, a single circuit, a composite circuit, a programmed processor, a parallel-programmed processor, an ASIC, an FPGA, or a combination thereof.

In the case where the processing circuit 1601 is a CPU 1604, the functions of the physical quantity for failure determination calculating unit 11, the sensor item for operation state classification selecting unit 12, the principal component calculating unit 13, the operation state classification unit 14, and the stable state extracting unit 16 are realized by software, firmware, or a combination of software and firmware. That is, the physical quantity for failure determination calculating unit 11, the sensor item for operation state classification selecting unit 12, the principal component calculating unit 13, the operation state classification unit 14, and the stable state extracting unit 16 are realized by processing circuit such as a CPU 1604, a system LSI or the like that execute a program stored in the HDD 1602, the memory 1603, or the like. Further, it can also be said that the program stored in the HDD 1602, the memory 1603, or the like causes a computer to execute the procedures and methods of the physical quantity for failure determination calculating unit 11, the sensor item for operation state classification selecting unit 12, the principal component calculating unit 13, the operation state classification unit 14, and the stable state extracting unit 16. Here, the memory 1603 corresponds to, for example, a nonvolatile or volatile semiconductor memory such as a RAM, a ROM, a flash memory, an EPROM, or an EEPROM, or a magnetic disk, a flexible disk, an optical disk, a compact disk, a mini disk, or a DVD.

Note that the functions of the physical quantity for failure determination calculating unit 11, the sensor item for operation state classification selecting unit 12, the principal component calculating unit 13, the operation state classification unit 14, and the stable state extracting unit 16 may be partially realized by dedicated hardware and partially realized by software or firmware. For example, the function of the physical quantity for failure determination calculating unit 11 can be realized by the processing circuit 1601 as dedicated hardware, and the functions of the sensor item for operation state classification selecting unit 12, the principal component calculating unit 13, the operation state classification unit 14, and the stable state extracting unit 16 can be realized by a processing circuit reading and executing a program stored in the memory 1603.

The post-classification sensor data accumulation unit 15 and the parameter for data classification storage unit 17 are realized using the HDD 1602, for example. Note that this is merely an example, and the post-classification sensor data accumulation unit 15 and the parameter for data classification storage unit 17 may be configured with a DVD, the memory 1603, or the like.

As described above, according to the first embodiment, the classification of the sensor data for each operation state is generated using the principal components of a plurality of the sensor data and the physical quantity to be used for failure determination calculated on the basis of the sensor data. That is, according to the operation state classification apparatus of the present invention, classification of operation states effective for failure detection can be generated using principal components.

Second Embodiment

In the first embodiment, the operation state classification unit 14 calculates minimal points of the probability density function and divides the physical quantities, with respect to the physical quantity for failure determination calculated by the physical quantity for failure determination calculating unit 11, labels the physical quantity from division corresponding to smaller physical quantity, and generates the classification for each operation state, using the principal component, using the labels as training data.

In the second embodiment, an embodiment in which an operation state classification unit 14 estimates probability density distribution of principal components of a plurality of sensor data, divides the probability density distribution, and assigns an operation state number, thereby generating classification of the sensor data for each operation state, will be described.

Figure 19:
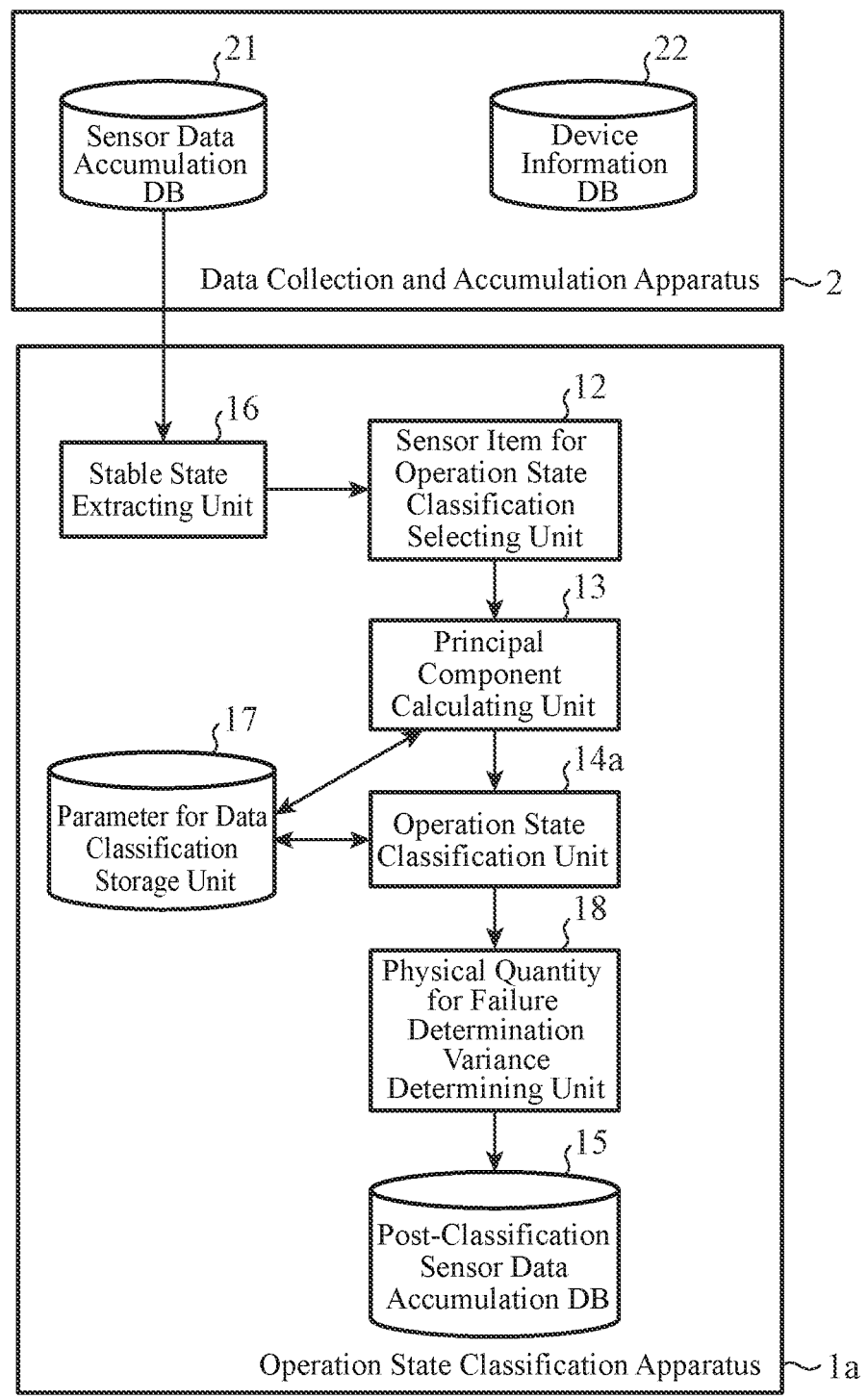
FIG. 19 is a configuration diagram of an operation state classification apparatus according to a second embodiment of the present invention.

FIG. 19 is a configuration diagram of an operation state classification apparatus 1a according to a second embodiment of the present invention.

With respect to the operation state classification apparatus 1a, components similar to those of the operation state classification apparatus 1 in the first embodiment described using FIG. 2 are denoted with the same reference signs, and redundant description thereof is omitted.

The operation state classification apparatus 1a of the second embodiment is different from the operation state classification apparatus 1 of the first embodiment in that a physical quantity for failure determination calculating unit 11 is not provided and a physical quantity for failure determination variance determining unit 18 is provided. In addition, an operation of an operation state classification unit 14a is different from the operation of the operation state classification unit 14 of the first embodiment.

The operation state classification unit 14a estimates probability density distribution for principal components of sensor data calculated by a principal component calculating unit 13 as samples and assigns operation state numbers for respective divisions divided at minimal points of the probability density distribution serving as boundaries, thereby generating classification of the samples or sensor data, for each operation state.

When generating classification for each operation state using the collected samples, the operation state classification unit 14a stores a range of a principal component in classification for each operation state in a parameter for data classification storage unit 17 in association with the operation state number. Thereafter, when classifying a collected sample, the sample is classified for each operation state on the basis of the range of the principal component stored in the parameter for data classification storage unit 17.

The physical quantity for failure determination variance determining unit 18 stores monitoring group information in a database or the like inside or outside the operation state classification apparatus 1a. In the monitoring group information, which post-classification sensor data in a group of an operation state number should be monitored, that is, the operation state suitable for monitoring the physical quantity for failure determination is defined, for each failure to be determined, in the post-classification sensor data classified by the operation state classification unit 14a.

The operation of the operation state classification apparatus 1a according to the second embodiment of the present invention is also roughly classified into "an operation to generate classification for each operation state using collected samples at the first time", and "an operation to assign an operation state number to and classify a continuously collected sample or sensor data after generation of classification". As fir the "operation to assign an operation state number to and classify a continuously collected sample or sensor data after generation of classification", the operation is similar to the operation of the operation state classification apparatus 1 of the first embodiment, which has been described using FIG. 14, and thus redundant description is omitted. The "operation to generate classification for each operation state using collected samples at the first time", which is different from the operation of the operation state classification apparatus 1 according to the first embodiment, will be described along the flowchart in FIG. 20.

Figure 20:
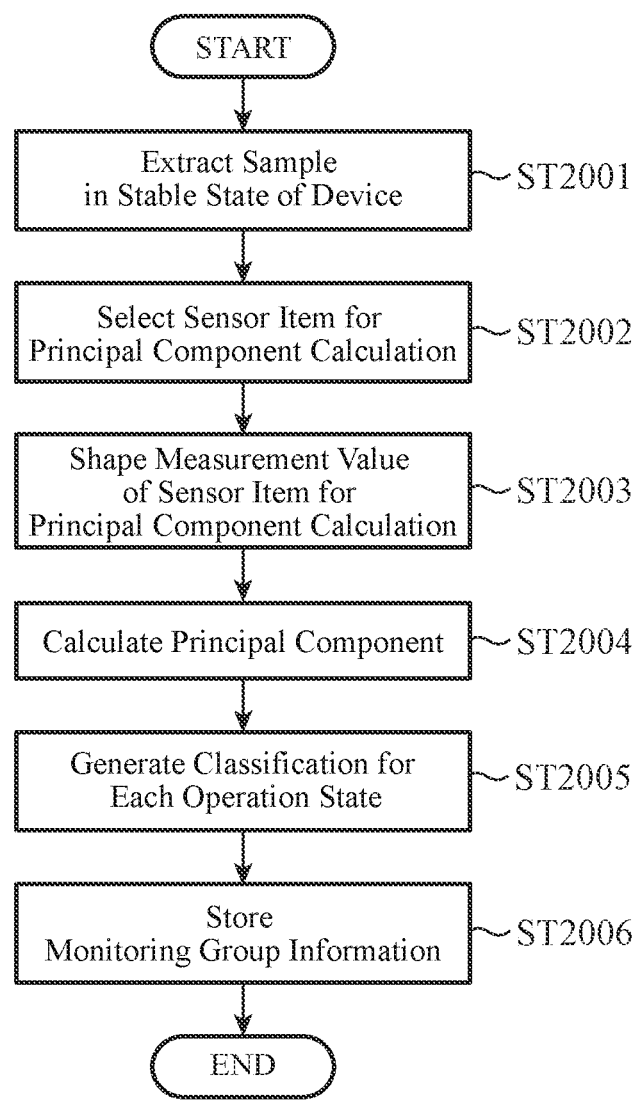
FIG. 20 is a flowchart for describing an operation of the operation state classification apparatus at the first operation according to the second embodiment of the present invention.

FIG. 20 is a flowchart for describing a first time operation of the operation state classification apparatus 1a according to the second embodiment of the present invention.

Operations in steps ST2001 to ST2004 in FIG. 20 are similar to the operations in step ST501 and steps ST503 to ST505 in FIG. 5 of the first embodiment, and thus redundant description is omitted.

In the second embodiment, specific operations of steps ST2005 and ST2006 are different from steps ST506 and ST507 in FIG. 5 of the first embodiment.

In step ST2005, the operation state classification unit 14a estimates the probability density distribution with respect to the principal component calculated by the principal component calculating unit 13, performing classification using minimal points of the probability density distribution as boundaries, and assigns different operation state numbers to the classifications, respectively. As a result, classification for each operation state is generated.

Further, the operation state classification unit 14a classifies the samples, and stores the post-classification sensor data of each of the samples in a post-classification sensor data accumulation DB 15.

To be specific, the operation state classification unit 14a classifies the principal components at minimal points of the estimated probability density distribution as boundaries, and assigns different operation state classification numbers to the classifications, respectively.

The operation state classification unit 14a then stores a range of the principal component for each operation state number in association with the operation state number in the parameter for data classification storage unit 17.

Note that data details stored in the parameter for data classification storage unit 17 are similar to the details of the example illustrated in FIG. 12 in the first embodiment.

The physical quantity for failure determination variance determining unit 18 stores the monitoring group information in the database or the like inside or outside the operation state classification apparatus 1a. In the monitoring group information, the operation state number of the post-classification sensor data to be monitored, that is, the operation state for which the physical quantity for failure determination is to be monitored is defined, for each failure to be determined, in the post-classification sensor data classified by the operation state classification unit 14a in step ST2005 (step ST2006).

To be specific, the physical quantity for failure determination variance determining unit 18 calculates, in each classification generated by the operation state classification unit 14a, respective variances of the physical quantities for failure determination for the samples including principal component values belonging to the respective classifications, associates the classification having small variance in the physical quantity for failure determination with information indicating the operation state number of the operation state and the failure to be determined, considering that the classification having the small variance is an operation state by which the physical quantity for failure determination is to be monitored, and stores the associated information regarding the classification, the number of the operation state, and the failure to be determined in the database or the like inside or outside the operation state classification apparatus 1a, as the monitoring group information.

Note that, for example, in step ST2005, the operation state classification unit 14a may generate classification of the operation state by equally dividing a range of values of the principal components, for the principal components calculated by the principal component calculating unit 13. The number of divisions may be determined using the technique to determine the number of divisions in step ST1004 in FIG. 10 by the operation state classification unit 14 in the first embodiment, such as the gap statistic or an information amount criterion.

As described above, in the second embodiment, the classification for the operation state can be generated using the principal components. Further, h the generated classification, by determining the operation state number of the operation state for which the physical quantity for failure determination is to be monitored and storing the information of the determined operation state number, only the sample or the sensor data of the operation state suitable for detecting the failure to be determined can be extracted. Then, by monitoring the physical quantity for failure determination included in the extracted sample or the like, whether change of the physical quantity for failure determination is due to failure of a device or due to change of an operation state can be grasped and efficient monitoring can be performed.

Note that the operation state classification apparatus 1a according to the second embodiment may be configured not to include a stable state extracting unit 16, may be configured not to include an sensor item for operation state classification selecting unit 12, or may be configured not to include the stable state extracting unit 16 and the sensor item for operation state classification selecting unit 12, similarly to the operation state classification apparatus 1 according to the first embodiment.

The hardware configuration of the operation state classification apparatus 1a according to the second embodiment is similar to the hardware configuration of the operation state classification apparatus 1 according to the first embodiment, which is described using FIG. 18, and thus detailed description thereof is omitted.

The functions of the operation state classification unit 14a and the physical quantity for failure determination variance determining unit 18 are realized by the processing circuit 1601.

Note that, in the first embodiment, the operation state classification apparatus 1 has the configuration illustrated in FIG. 2. In such a configuration, the operation state classification apparatus 1 can achieve the above-described effects by including the physical quantity for failure determination calculating unit 11, the principal component calculating unit 13, and the operation state classification unit 14.

Further, in the second embodiment, the operation state classification apparatus 1a has the configuration illustrated in FIG. 19, and the operation state classification apparatus 1a can achieve the above-described effects by including the principal component calculating unit 13 and the operation state classification unit 14a.

In the present invention, a free combination of embodiments, a modification of any configuration element of the embodiments, or an omission of ay configuration element in the embodiments can be employed within the scope of the invention.

INDUSTRIAL APPLICABILITY

The operation state classification apparatus according to the present invention generates classification of sensor data for each operation state, using principal components of a plurality of sensor data and a physical quantity to be used for failure determination calculated on the basis of the sensor data. That is, the operation state classification apparatus of the present invention is configured to generate the classification of the driving state effective for failure detection, using the principal components, and thus can be applied to an operation state classification apparatus that generates classification of each operation state of sensor data acquired from sensors installed in control devices in a control system of an elevator, a plant apparatus, an air conditioner, or the like.

REFERENCE SIGNS LIST

1: Operation state classification apparatus, 2: Data collection and accumulation apparatus, 3: Monitoring object, 4: Sensor network, 11: Physical quantity for failure determination calculating unit, 12: Sensor item for operation state classification selecting unit, 13: Principal component calculating unit, 14, 14a: Operation state classification unit, 15: Post-classification sensor data accumulation DB, 16: Stable state extracting unit, 17: Parameter for data classification storage unit, 18: Physical quantity for failure determination variance determining unit, 21: Sensor data accumulation DB, 22: Device information DB, 1601: Processing circuit, 1602: HDD, 1603: Memory, 1604: CPU

The invention claimed is:

1. An operation state classification apparatus comprising:
a principal component calculator calculating a principal component of a plurality of sensor data collected from a device;
a physical quantity for failure determination calculator calculating, independent of the calculation of the principal component, a physical quantity to be used for failure determination on a basis of the plurality of sensor data; and
an operation state classifier performing generation of classification of a sensor data collected from the device for each operation state using the principal component calculated by the principal component calculator and the physical quantity calculated by the physical quantity for failure determination calculator,
wherein the operation state classification apparatus detects a deterioration or failure of the device based on the classification.

2. The operation state classification apparatus according to claim 1, wherein
the operation state classifier divides a range of the physical quantity into a plurality of ranges on a basis of a probability density function of the physical quantity calculated by the physical quantity for failure determination calculator and gives each of the plurality of ranges a label, and performs the generation of classification of the sensor data collected from the device for each operation state by grouping the principal component calculated by the principal component calculator using the label as training data.

3. The operation state classification apparatus according to claim 1, wherein the principal component calculator calculates a principal component value of the sensor data collected from the device on a basis of the principal component, and
the operation state classifier stores a range of the principal component for each classification when performing the generation of classification for each operation state, and classifies the sensor data collected from the device, for each operation state, on a basis of the principal component value calculated by the principal component calculator and the stored range of the principal component, after the generation of classification.

4. The operation state classification apparatus according to claim 1, further comprising a stable state extractor extracting a plurality of sensor data in a stable state, from the plurality of sensor data collected from the device, wherein
the principal component calculator calculates a principal component of the plurality of sensor data in the stable state extracted by the stable state extractor, and
the physical quantity for failure determination calculator calculates the physical quantity to be used for failure determination on a basis of the plurality of sensor data in the stable state extracted by the stable state extractor.

5. The operation state classification apparatus according to claim 1, further comprising a sensor item for operation state classification selector selecting a sensor item to be used for calculation of the principal component, and shaping sensor data including a measurement value of the selected sensor item, for the sensor data collected from the device, wherein the principal component calculator calculates a principal component of the sensor data including the measurement value of the sensor item selected by the sensor item for operation state classification selector, the sensor data being shaped by the sensor item for operation state classification selector, among the plurality of sensor data collected from the device.

6. The operation state classification apparatus according to claim 5, wherein the sensor item for operation state classification selector shapes the sensor data, using a sensor data shaping weight determined in accordance with a distribution characteristic of the measurement value, for each selected sensor item.

7. An operation state classification apparatus comprising:
a principal component calculator calculating a principal component of a plurality of sensor data collected from a device; and
an operation state classifier performing generation of classification of the sensor data collected from the device, for each operation state, on a basis of a probability density distribution of the principal component calculated by the principal component calculator,
wherein the operation state classification apparatus detects a deterioration or failure of the device based on the classification and at least one other quantity obtained, independent of the calculation of the principal component, from one or more sensors.

8. The operation state classification apparatus according to claim 7, further comprising a physical quantity for failure determination variance determinator calculating a physical quantity to be used for failure determination and included in the at least one other quantity on a basis of the plurality of sensor data classified into each classification generated by the operation state classifier, and determining the classification to be monitored on a basis of variance of the calculated physical quantity in the classification.

9. The operation state classification apparatus according to claim 7, wherein the operation state classifier stores a range of the principal component for each classification when generating the classification for each operation state, and classifies the sensor data collected from the device, for each operation state, on a basis of the stored range of the principal component, after the generation of classification.

* * * * *